(12) United States Patent
Parker

(10) Patent No.: US 6,832,226 B1
(45) Date of Patent: Dec. 14, 2004

(54) METHOD OF PROVIDING DATA DICTIONARY-DRIVEN WEB-BASED DATABASE APPLICATIONS

(76) Inventor: Bruce H. Parker, 827 Fontaine St., Alexandria, VA (US) 22302

( * ) Notice: Subject to any disclaimer, the term of this patent is extended or adjusted under 35 U.S.C. 154(b) by 206 days.

(21) Appl. No.: 09/685,584

(22) Filed: Oct. 11, 2000

(51) Int. Cl.[7] .............................................. G06F 17/30
(52) U.S. Cl. ....................... 707/101; 707/102; 707/103; 715/515; 715/516
(58) Field of Search ............................ 707/1, 2, 3, 4, 707/5, 9, 10, 101, 102, 103, 104.1; 715/514, 515, 516

(56) References Cited

U.S. PATENT DOCUMENTS

| | | | |
|---|---|---|---|
| 6,016,394 A | * | 1/2000 | Walker ........................ 707/103 |
| 6,230,157 B1 | * | 5/2001 | Malcolm et al. ............. 707/100 |
| 6,345,278 B1 | * | 2/2002 | Hitchcock et al. ........... 707/100 |
| 6,362,836 B1 | * | 3/2002 | Shaw et al. .................. 709/207 |
| 6,363,393 B1 | * | 3/2002 | Ribitzky ...................... 707/102 |

* cited by examiner

*Primary Examiner*—Shahid Alam
*Assistant Examiner*—Isaac Woo
(74) *Attorney, Agent, or Firm*—Hayes Soloway P.C.

(57) ABSTRACT

A method for creating a web-based database application that is data dictionary driven is disclosed. A web site, containing various computer programs, data for a database application and a data dictionary describing both the structure of an application database and the requirements for the database application, creates web pages for facilitating the execution of a database application over the internet. The method comprises the steps of creating, updating and maintaining an on-line data dictionary, and creating and initially populating a database for the application. The various programs at the web site create web pages for the application, update the data dictionary and facilitate modification of the data structure for the application. The data dictionary may be initialized: from electronic data uploaded to the web site; from the data-dictionary records describing an existing web-based application; or directly by the user via a web interface. The resulting application allows the user to enter information, view information, select the records to be viewed, and make changes to the application such as form captions, fields displayed, colors used, database structure, and other contents of the data dictionary.

62 Claims, 60 Drawing Sheets

CREATE A SITE

[Explain process]

⦿ New Customer ○ Existing Customer

New Site Information

Customer Info:

| | | |
|---|---|---|
| Customer Name: | ChesapeakeData | Must be Unique |
| Customer Web Site: | http://www.ChesData.com | |

Contact Info:

| | |
|---|---|
| Name: | Joe Smith |
| Mailing Address: | 12 Main St |
| City: | Arlington |
| State/Region: | VA |
| Postal Code: | 22209 |
| Country: | USA |
| Email: | joe@chesapeake.com |
| Phone: | 703-444-1234 |

Figure 3B

Project Info:

Enter Project Name: | Membership |
Enter Administrator PIN: | Admin |
Enter Reader PIN: | Read |
Enter Writer PIN: | Write |

Data Info:

- ⦿ Upload my data or use the template selected below

- ☑ Copy Lookup Table Data from Template

- ☐ Copy All Data from Template

| ○ Address Book | ○ In/Out Board | ○ Resourc |
|---|---|---|
| ○ Asset Tracking | ⦿ Inventory Control | ○ Service |
| ○ Book Collection | ○ Ledger Management | ○ Students |
| ○ Contact Management | ○ Inventory Control | ○ Time an |
| ○ Donation Management | ○ Music Collection | ○ Video C |
| ○ Event Management | ○ Order Entry | ○ Wine Lis |

Figure 3C

Congratulations, your account has been created succesfully!

Press the GO button to have your data created

MDB file to be uploaded: \\PCG2000\wwwroot\Chris  Browse...

Upload your database

Figure 3F

Your file 'tasks.mdb' has been uploaded

| << | < | > | >> | More | Fewer | Refresh | Record | Filter | Clear Filter | Export | New | Report | Help |

Help

Members List

12 Records Selected. Go to Recor [1] Records Per Pa [10] Table Indice [Last Na Sort Order: Last Name    A B C D E F G H I J K L M N O P Q R S T U V WX

| # | First Name | Last Name | Work Company | Work City | Work State | Work Phon | Work Ext | Work Email | W |
|---|---|---|---|---|---|---|---|---|---|
| 1 | Art | Braunschweiger | | | | | | | |
| 2 | Steven | Buchanan | Flyteworks | London | | (71) 555-4848 | | steveb@anywhere.com | |
| 3 | Laura | Callahan | ByteComp, Inc. | | | | | laurac@anywhere.com | (2 5 1 |
| 4 | Nancy | Davolio | ABX Compute Corporation | Tacoma | WA | (204) 555-9842 | | nancyd@anywhere.com | (2 5 9 |

Figure 8B

| Apply Filter | Clear Filter | Record | List | Export | Count | New | Report | Help |

Members Filter

Ready for Selection Criteria:    Table Indices: Last Name, First Name

| Field | | | | |
|---|---|---|---|---|
| Last Name | | | | |
| Work Company | | | | |
| Work State | ☐ | | | |
| Work Country | | | | |
| Home State | ☐ | | | |
| Home Country | | | | |
| Member Type | ▾ | | | |
| Date Joined | Between | | And | |
| Member Dues | Between | | And | |
| Birthdate | Between | | And | |
| Date Added | Between | | And | |
| Date Last Updated | Between | | And | |

Figure 8C

Members Entry/Edit

[First] [Prev] [Next] [Last] | [Filter] [Copy] [New] [List] [Save] [Cancel] [Delete] [Export] [Help] [Menu] [Help]

Record 4 of 12    Go to Record# [4]    Table Indices: [Last Name, First Name]

[Committee Members]    [Payments]

Prefix [    ]    First Name [Nancy]    Last Name [Davolio]    Suffix [    ]

Dear [    ]    Work Title [Sales Representa]    Member Type [Full Member ▾]    Date Joined [6/5/93]

Work Company [ABX Compute Corporation]

Work Address [908 W. Capital Way]    Work Address [                    ]

Work City [Tacoma]    Work State [WA]    Work Postal Code [94801]

Work Country [USA]    Work Email [nancyd@anywhere.com]

Work Phone [(204) 555-9482]    Work Ext [    ]    Work Fax [(204) 555-9483]

Figure 8D

| Export Text | Export Spreadsheet | Record | Filter | List | Report | Help | Menu |

Members Export

Table Indices: Last Name, First Name  V

☑ Export Column Headers

☑ Export Values From Lookup Tables

○ Export Current Record Only

⦿ Export Records Based on Current Filter

○ Export All Records (this will reset the current filter)

Figure 8E

Members Reports

Report | Record | Filter | List | Help | Menu | Help

Table Indices  Last Name, First Na ⌄

Report Subtitle: [          ]          Font: [Arial ⌄]

☑ Print Record Count                   Font Size: [2 ⌄]

☑ Print Filter

☑ Print records in a grid

☑ Print Width Of Paper

Select TableNameDisplay, TableName FROM tWebTable Where tablename = 'tMember' Or actualtablename = 'tMemb ⦿ Members

[ Report ]

Figure 8F

Chesapeake Data Systems

Customer Order System

| Enter Your Personal ID Number |
|---|
| ******* |
| Submit |

Remember - your PIN is case sensitive.)

Forgot the Administration PIN?
Click here to have us email it to the system administrator

Figure 9A

Chesapeake Data System

Customer Order System

Web Application Maintenance

| | |
|---|---|
| Lookup Tables | (Fig. 9C) |
| Application Specifications | (Fig. 9D) |
| Change Reports | |
| Change Button Text and Form Colors | (Fig. 9Q) |
| Change Database Structure | (Fig. 9X) |
| Upload Application Data | (Fig. 9AJ) |

Application Main Menu

Figure 9B

Chesapeake Data System

Customer Order System

Lookup Tables

Committees

Countries

Member Types

Payment Methods

Setup

States

Maintenance Main Menu

Figure 9C

Chesapeake Data System

Customer Order System

Application Specifications Maintenance

<u>Site Information</u> (Fig. 9E)

<u>Application Tables</u> (Fig. 9F)

<u>Application Table Indices</u> (Fig. 9G)

<u>Lookup Fields For Pick Lists</u> (Fig. 9J)

<u>Fields Displayed on Forms</u> (Fig. 9K)

<u>Field Captions</u> (Fig. 9M)

<u>Field Specifications</u> (Fig. 9U)

<u>Filter Fields From Other Tables</u>

Figure 9D

| Save | Cancel | Help | Menu | Help

Web Site Information Entry/Edi

Record 1 of 1

| | |
|---|---|
| Organization | Chesapeake Data System |
| Application Name | Customer Order System |
| Read PIN | |
| Update PIN | |
| Administer PIN | Admin |
| Sys Admin Email | bruce@potomac.com |
| Phone Number Format | (999) 999-9999 |
| European Dates | ☐ |
| Header HTML | |
| Footer HTML | |
| Security | ☐ |

Figure 9E

Application Tables List

Save | Menu | Help

9 Records Selected
Sort Order: Table Name  A B C D E F G H I J K L M N O P Q R S T U V W X Y Z  All

| Table Name | Display Name | Table Type | Web Accessible | Record Display As Table | Filter Display As Table | Add Records ? | Delete Records ? |
|---|---|---|---|---|---|---|---|
| tCommittee | Committees | Lookup | 1 | ☐ | ☑ | ☑ | ☑ |
| tCommitteeANdMembe | Committee Memb | Detail | 1 | ☐ | ☑ | ☑ | ☑ |
| tCountry | Countries | Lookup | 1 | ☑ | ☑ | ☑ | ☑ |
| tMember | Members | Primary | 1 | ☑ | ☑ | ☑ | ☑ |
| tMemberType | Member Types | Lookup | 1 | ☑ | ☑ | ☑ | ☑ |
| tPayment | Payments | Primary | 2 | ☑ | ☑ | ☑ | ☑ |
| tPaymentMethod | Payment Methods | Lookup | 1 | ☑ | ☑ | ☑ | ☑ |
| tSetup | Setup | Setup | 1 | ☑ | ☑ | ☑ | ☑ |
| tState | States | Lookup | 1 | ☑ | ☑ | ☑ | ☑ |

For each table in the list, select the appropriate "Table Type":
Primary = Shown on application's main menu

Figure 9F (Fig. 9H) — Apply Filter | Clear Filter | List | Menu | Help

Table Indices Filter

Enter Selection Criteria

Table Name: tMember ▾

Figure 9G

Table Indices List

Filter | Save | Menu | Help

6 Records Selected. TableName=tMember
Sort Order: Table Name  A B C D E F G H I J K L M N O P Q R S T U V W X Y Z All

| Table Name | Index Name | Display Name | Seq. | Unique | Field 1 |
|---|---|---|---|---|---|
| tMember | LastNameFirstName | Last Name, First Na | 1 | No | LastName |
| tMember | WorkCompany | Work Company | 2 | No | WorkCompany |
| tMember | WorkPostalCode | Work Postal Code | 4 | No | WorkPostalCode |
| tMember | MemberTypeID | Member Type ID | 5 | No | MemberTypeID |
| tMember | DateJoined | Date Joined | 6 | No | DateJoined |
| tMember | MemberID | Member ID | 8 | No | MemberID |

Figure 9H (Fig. 9J) | Apply Filter | Clear Filter | List | Menu | Help

Lookup Fields Filter

Enter Selection Criteria

Table Name tMember  [v]

This form is used to. . . . . . .

Select a table and then click on "Apply Filter" to make the changes to the corresponding table information.

Figure 9I

Filter | Save | Menu | Help

Lookup Fields List

37 Records Selected.   TableName=tMember

Sort Order: Last Name    A B C D E F G H I J K L M N O P Q R S T U V WX

| Table Name | Sequence | Field Name | Lookup Field Display |
|---|---|---|---|
| tMember | 1 | MemberID | 1 |
| tMember | 2 | Prefix | 0 |
| tMember | 3 | FirstName | 3 |
| tMember | 4 | LastName | 2 |
| tMember | 5 | Suffix | 0 |
| tMember | 6 | Dear | 0 |
| tMember | 7 | WorkTitle | 0 |
| tMember | 8 | WorkCompany | 0 |
| tMember | 9 | WorkAddress | 0 |
| tMember | 10 | WorkAddress2 | 0 |
| Table Name | Sequence | Field Name | Lookup Field Display |
| tMember | 11 | WorkCity | 0 |

Figure 9J

Fields Displayed List

[Filter] [Save] [Menu] [Help]

37 Records Selected TableName=tMember
Sort Order: Table Name  A B C D E F G H I J K L M N O P Q R S T U V W X Y Z  All

| Table Name | Seq | Field Name | Field Type | Web Accessible | Cap Posit | Sp Bef Cap |
|---|---|---|---|---|---|---|
| tMember | 1 | MemberID | 24 | 1 | | 0 |
| tMember | 2 | Prefix | 10 | 1 | L | P |
| tMember | 3 | FirstName | 10 | 1 | L | 5 |
| tMember | 4 | LastName | 10 | 1 | L | 5 |
| tMember | 5 | Suffix | 10 | 1 | L | 5 |
| tMember | 6 | Dear | 10 | 1 | L | P |
| tMember | 7 | WorkTitle | 10 | 1 | L | 5 |
| tMember | 8 | WorkCompany | 10 | 1 | L | P |
| tMember | 9 | WorkAddress | 10 | 1 | L | P |

Figure 9L (Fig. 9N) — Apply Filter | Clear Filter | List | Menu | Help

Field Captions Filter

Enter Selection Criteria

Table Name tMember [V]

Figure 9M

Fields Captions List

Filter | Save | Menu | Help

37 Records Selected TableName=tMember
Sort Order: Table Name  A B C D E F G H I J K L M N O P Q R S T U V W X Y Z  All

| Table Name | Sequence | Field Name | Record Caption | Filter Caption | List Caption |
|---|---|---|---|---|---|
| tMember | 1 | MemberID | MemberID | | |
| tMember | 2 | Prefix | Prefix | | |
| tMember | 3 | FirstName | FirstName | | |
| tMember | 4 | LastName | LastName | | |
| tMember | 5 | Suffix | Suffix | | |
| tMember | 6 | Dear | Dear | | |
| tMember | 7 | WorkTitle | WorkTitle | | |
| tMember | 8 | WorkCompany | WorkCompany | | |
| tMember | 9 | WorkAddress | WorkAddress | | |
| tMember | 10 | WorkAddress2 | WorkAddress2 | | |

Figure 9N (Fig. 9P) — Apply Filter | Clear Filter | List | Menu | Help

Field Specifications Filter

Enter Selection Criteria

Table Name tMember  V

Figure 9O

Fields Specifications List

Filter | Save | Menu | Help

37 Records Selected TableName=tMember
Sort Order: Table Name  A B C D E F G H I  J K L  M N O P Q R S T U V W X Y Z  All

| Table Name | Sequence | Field Name | Update | Record Req | Default Value | Display Size |
|---|---|---|---|---|---|---|
| tMember | 1 | MemberID | ☐ | ☐ | | 10 |
| tMember | 2 | Prefix | ☑ | ☐ | | 15 |
| tMember | 3 | FirstName | ☑ | ☑ | | 15 |
| tMember | 4 | LastName | ☑ | ☑ | | 15 |
| tMember | 5 | Suffix | ☑ | ☐ | | 10 |
| tMember | 6 | Dear | ☑ | ☐ | | 10 |
| tMember | 7 | WorkTitle | ☑ | ☐ | | 15 |
| tMember | 8 | WorkCompany | ☑ | ☐ | | 50 |
| tMember | 9 | WorkAddress | ☑ | ☐ | | 30 |
| tMember | 10 | WorkAddress2 | ☑ | ☐ | | 30 |

Figure 9P

Chesapeake Data System
Web Application Maintenance - Buttons and Colors

| | |
|---|---|
| Button Text - List Form | (Fig. 9R) |
| Button Text - Record Form | (Fig. 9S) |
| Button Text - Filter Form | (Fig. 9T) |
| Button Text - Other | (Fig. 9U) |
| Form Colors | (Fig. 9V) |
| | |
| Maintenance Main Menu | (Fig. 9B) |

Figure 9Q

Save | Cancel | Help | Menu | Help

Button Text - List Form Entry/Edit

Record 1 of 1

| | |
|---|---|
| List Button First Text | < < |
| List Button First Tooltip | Go to the first record |
| List Button First Picture | |
| List Button Prev Text | < |
| List Button Prev Tooltip | Display the previous set of records |
| List Button Prev Picture | |
| List Button Next Text | > |
| List Button Next Tooltip | Display the next set of records |
| List Button Next Picture | |
| List Button Last Text | > > |
| List Button Last Tooltip | Display the last set of records |
| List Button Last Picture | |
| List Button More Text | More |
| List Button More Tooltip | Display more records |
| List Button More Picture | |

Figure 9R

[Save] [Cancel] [Help] [Menu]

Button Text - Record Form Entry/Edit

Record 1 of 1

| | |
|---|---|
| Record Button First Text | First |
| Record Button First Tooltip | Go to the first record in the table |
| Record Button First Picture | |
| Record Button Prev Text | Prev |
| Record Button Prev Tooltip | Go to the previous record |
| Record Button Prev Picture | |
| Record Button Next Text | Next |
| Record Button Next Tooltip | Go to the next record |
| Record Button Next Picture | |
| Record Button Last Text | Last |
| Record Button Last Tooltip | Go to the last record |
| Record Button Last Picture | |
| Record Button Filter Text | Filter |
| Record Button Filter Tooltip | Display the filter form |
| Record Button Filter Picture | |

Figure 9S

Button Text - Filter Form Entry/Edit

Save | Cancel | Help | Menu

Record 1 of 1

| Field | Value |
|---|---|
| Filter Button Apply Filter Text | Apply Filter |
| Filter Button Apply Filter Tooltip | Apply Filter and Display List Form |
| Filter Button Apply Filter Picture | |
| Filter Button Clear Filter Text | Clear Filter |
| Filter Button Clear Filter Tooltip | Clear the current filter |
| Filter Button Clear Filter Picture | |
| Filter Button Record Text | Record |
| Filter Button Record Tooltip | Display the Record form |
| Filter Button Record Picture | |
| Filter Button List Text | List |
| Filter Button List Tooltip | Display the List form |
| Filter Button List Picture | |
| Filter Button ExpText | Export |
| Filter Button ExpTooltip | Display the export form |
| Filter Button ExpPicture | |

Figure 9T

| Save | Cancel | Help | Menu |

Button Text - Other Entry/Edit

Record 1 of 1

| Field | Value |
|---|---|
| Button Menu Text | Menu |
| Button Menu Tooltip | Return to the main menu |
| Button Menu Picture | |
| New Button Insert Text | Insert |
| New Button Insert Tooltip | Add a new record |
| New Button Insert Picture | |
| New Button Cancel Text | Cancel |
| New Button Cancel Tooltip | Return to the previous form without saving the dat |
| New Button Cancel Picture | |
| Exp Button List Text | List |
| Exp Button List Tooltip | Display the List form |
| Exp Button List Picture | |
| Export Button Txt Text | Export Text |
| Export Button Txt Tooltip | Export data in Text format |
| Export Button Txt Picture | |

Figure 9U

Web Colors Parameters List

Record | Filter | Help | Menu | Help

29 Records Selected
Sort Order: Type Displa  A B C D E F G H I J K L M N O P Q R S T U V W X Y Z  All

| Type Display | Type | Font | Size | Bold | Italics | Color | Background |
|---|---|---|---|---|---|---|---|
| Body | Body | Arial | 0 | No | No | Black | #EEEE |
| Export Form | ExportForm | Arial | 2 | No | No | Black | #EEEE |
| Export Sort Order | ExportSortOrder | Arial | 2 | No | No | Black | #EEEE |
| Export Title | ExportTitle | Arial | 6 | No | No | Black | #EEEE |
| Export Status | ExportStatus | Arial | 2 | No | No | Black | #EEEE |
| Filter Form | FilterForm | Arial | 2 | No | No | Black | #EEEE |
| Filter Sort Order | FilterSortOrder | Arial | 2 | No | No | Black | #EEEE |
| Filter Status | FilterStatus | Arial | 2 | No | No | Black | #EEEE |
| Filter Table | FilterTable | Arial | 1 | No | No | Black | #EEEE |

Figure 9V

| First | Prev | Next | Last | | Filter | List | | Save | Cancel | Delete | Help | Menu |

Web Color Parameters Entry/Edit

Record 2 of 29

| | |
|---|---|
| Type Display | Export Form |
| Type | Export Form |
| Font | Arial |
| Size | 2 |
| Bold | ☐ |
| Italics | ☐ |
| Color | Black |
| Background Color | #EEEEEE |

Figure 9W

Chesapeake Data System
Change Database Structure

| | |
|---|---|
| Add Tables From System-Wide Data Dictionary | (Fig. 9Y) |
| Add a Table | (Fig. 9Z) |
| Change Database Structures (Field Sequence Numbers 1-15) | (Fig. 9AA |
| Change Database Structures (Field Sequence Numbers 16-30) | (Fig. 9AA |
| Change Database Structures (Field Sequence Numbers 31-45) | (Fig. 9AA |
| Change Database Structures (Field Sequence Numbers 46-60) | (Fig. 9AA |
| Change Database Structures (Field Sequence Numbers 61-75) | (Fig. 9AA |
| Remove Tables | (Fig. 9AC) |
| Remove Fields | (Fig. 9AD) |
| Remove Indices | (Fig. 9AG) |
| Remove Relationships | (Fig. 9AH |

Figure 9X

Add Tables List

106 Records Selected TableName=tMember
Sort Order: Table Name  A B C D E F G H I J K L M N O P Q R S T U V WX

| Add | Copy Data | Table Name |
|---|---|---|
| ☐ | ☐ | |
| ☐ | ☐ | InOut |
| ☐ | ☐ | tAccount |
| ☐ | ☐ | tAccountType |
| ☐ | ☐ | tActor |
| ☐ | ☐ | tAddress |
| ☐ | ☐ | tAsset |
| ☐ | ☐ | tAssetCategory |
| ☐ | ☐ | tAssetStatus |
| ☐ | ☐ | tAssignment |
| ☐ | ☐ | tAttendee |
| ☐ | ☐ | tAuthor |
| ☐ | ☐ | tBook |

Figure 9Y

| Insert | Cancel | Help |

Add Table Entry/Edit
Enter values for new record

---

Table Name [_____] Display Name [_____] Table Type [_____]
Web Accessible [1] Record Display as Table ☑ Filter Display as Table
Records Can Be Added ☑ Records Can Be Deleted ☑

Figure 9Z (Fig. 9AB) — Apply Filter | Clear Filter | List | Menu | Help

Field Specifications Filter

Enter Selection Criteria

Table Name tCountry | V |

Figure 9AA

Field Specifications List

Filter | Save | Menu | Help

2 Records Selected
Sort Order: Table Name  A B C D E F G H I J K L M N O P Q R S T U V W X Y Z  All

| Sequence | Display Name | Field Type | Field Size | Index Type | Lookup Table |
|---|---|---|---|---|---|
| 1 | CountryID | Autonu | 1 | Unique V | |
| 2 | Country | Text | 1 | Unique V | |

Figure 9AB

Save | Menu | Help

Remove Tables List

9 Records Selected

Sort Order: Table Name  A B C D E F G H I J K L M N O P Q R S T U V WX

| Delete | Table Name |
|--------|------------|
| ☐ | tCommittee |
| ☐ | tCommitteeAndMember |
| ☐ | tCountry |
| ☐ | tMember |
| ☐ | tMemberType |
| ☐ | tPayment |
| ☐ | tPaymentMethod |
| ☐ | tSetup |
| ☐ | tState |

Figure 9AC

| Apply Filter | Clear Filter | List | Menu | Help |

Remove Fields Filter

Enter Selection Criteria

Table Name tMember V

Figure 9AD

| Filter | Help | Save | Menu | Help |

Remove Fields List

37 Records Selected. TableName=tMember
Sort Order: Table Name  A B C D E F G H I  J K L M N O P Q R S T U V WX

| Delete | Table Name | Sequence | Field Name |
|---|---|---|---|
| ☐ | tMember | 1 | MemberID |
| ☐ | tMember | 2 | Prefix |
| ☐ | tMember | 3 | FirstName |
| ☐ | tMember | 4 | LastName |
| ☐ | tMember | 5 | Suffix |
| ☐ | tMember | 6 | Dear |
| ☐ | tMember | 7 | WorkTitle |
| ☐ | tMember | 8 | WorkCompany |
| ☐ | tMember | 9 | WorkAddress |

Figure 9AE

| Apply Filter | Clear Filter | List | Menu | Help |

Remove Indices Filter

Enter Selection Criteria

Table Name tMember  V

Figure 9AF

Remove Indices List

| Filter | Help | Save | Menu | Help |

6 Records Selected. TableName=tMember
Sort Order: Table Name  A B C D E F G H I J K L M N O P Q R S T U V W X Y Z  All

| Delete | Table Name | Index Name | Display Name | Field Names | Sequence |
|---|---|---|---|---|---|
| ☐ | tMember | LastNameFirstName | Last Name, First N | [LastName],[FirstN] | 1 |
| ☐ | tMember | WorkCompany | Work Company | [WorkCompany] | 2 |
| ☐ | tMember | WorkPostalCode | Work Postal Code | [WorkPostalCode] | 4 |
| ☐ | tMember | MemberTypeID | Member Type ID | [MemberTypeID] | 5 |
| ☐ | tMember | DateJoined | Date Joined | [DateJoined] | 6 |
| ☐ | tMember | MemberID | Member ID | [MemberID] | 8 |

Figure 9AG

| Apply Filter | Clear Filter | List | Menu | Help |

Remove Relationships Filter

Enter Selection Criteria

Table Name tMember  V

Figure 9AH

| Filter | Help | Save | Menu | Help |

Remove Relationships List

1 Records Selected. TableName=tMember
Sort Order: Table Name  A B C D E F G H I J K L M N O P Q R S T U V W X Y Z  All

| Delete | Table Name | Field Name | Field Name 2 | Field Name 3 | Lkup Table |
|---|---|---|---|---|---|
| ☐ | tMember | MemberType1 | | | tMemberType |

METHOD OF PROVIDING DATA DICTIONARY-DRIVEN WEB-BASED DATABASE APPLICATIONS

FIELD OF THE INVENTION

The present invention relates generally to data bases and more particularly, to a method of using a data dictionary to create a web-based database application.

BACKGROUND

A data dictionary is an electronic repository of information that describes many of the components of a database application. A data dictionary for web-based database applications may contain information describing one or more of the following: (1) the web application's database structure (tables, fields, indices, and relationships), (2) database characteristics (required fields, field masks, etc), and (3) the web application's components (menus, forms, reports, export formats, etc.). It may also contain information relating to (4) the text or images that are displayed on web forms and menus (for buttons, captions, labels, form titles, messages, etc.), (5) the fonts and colors used to display text on the web forms, (6) the location where the various items are to be displayed on the form, arid (7) programming code that is to be executed when the web application is run.

A web-based database application program consists of two primary components: (1) the "applications" component, which is responsible for running the database application, allowing users to enter information, view information, and select the records to be viewed, and (2) the "data dictionary maintenance" component, which allows the system administrator to make changes to the application (application specifications, form captions, fields displayed, colors used, database structure, and other contents of the data dictionary).

Using a data dictionary as the underlying concept for a web-based database application provides many advantages. Some of these advantages include: (1) development of web-based database applications without needing a programmer or web developer; (2) minimal cost to set up a sophisticated, user-friendly web database application that typically includes forms for filtering, listing, and reviewing records in a database, menus, etc.; (3) the ability of a user to change the look and feel of the application pages without needing a programmer or web developer; and (4) various levels of security to limit who can review or change the data.

Web pages fall into two general categories—static and dynamic. Static web pages are presented to the user (after being interpreted by the user's browser) without modification. These files generally contain only HTML codes, text, and graphics, and have the file extension of HTM or HTML. Examples include help text and menus. Dynamic web pages, on the other hand, have program code (or pseudo-code) imbedded in them which dynamically creates the HTML code that is sent to the browser. The program code can be used to retrieve data from a database, create HTML code for displaying the data in a table, etc.

Many internet sites currently host web-based database applications. At virtually all of these sites, the application is either provided by the user or the service provider. In both of these cases, a significant amount of programming is usually required for each web page that contains data which is extracted from a database in real-time. In order to reduce development time, many programmers use web-development tools which contain "wizards". Wizards are programs that create web pages based on information about the application that is provided by the developer when the "wizard" is run. There are two problems with this approach: (1) once the "wizard" is run, the user often has to make extensive changes to the code produced and (2) the information provided to the "wizard" is usually not saved; the developer must re-enter the data when re-running the "wizard".

SUMMARY OF THE INVENTION

The present invention allows for web-based database applications to be run based on data in a data dictionary. A central web site contains both the application's data and the data dictionary. The present invention includes the following steps and functions:

A central web site is set up with a data dictionary, a data base server, programs which produce menus and forms for a data base application, programs which produce menus and forms for the data dictionary maintenance procedures and a project directory.

The data dictionary contains information for both the data dictionary maintenance forms and sample application forms. The data base server may have new databases added to it. Programs which produce menus and forms for a database application and perform the functions needed to run the database application such as add, change, and delete records, perform data validation, etc. Programs which produce menus and forms for the data dictionary maintenance procedures perform the functions needed to update the data dictionary and change the application's database structure. A project directory is created dynamically for each database application when a new database project is started.

A user opens a web page at a central web site and is led though a series of steps to create the database application. The invention allows for a database application to be created in one of three ways. The user may upload electronic data to a web site. A program on the web site creates a new database for the user and copies the data dictionary tables into the database. A second program on the web site reads the electronic data and updates the data dictionary with information about the database structure and requirements (e.g., table names and properties, field names and properties, index names and properties, relationships among the tables, etc). A third program on the web site then creates the application tables in the database. A fourth program reads the data uploaded by the user and populates the application tables in the database.

Alternatively, the web site may contain many sample database applications. The user selects one of the sample applications, and a program on the web site creates a new database application for the user.

In another alternative, the user may request that the system create empty database for the application. The user then uses the "application maintenance" programs (see below) to create the application tables and fields.

In should be noted that for each of the three approaches described above, a program on the web site creates a directory on the web site for a user's project and copies several files into the directory.

The user may start the database application by using a web browser to request a web page in the user's project directory. The application allows the user to enter or change information, view information, select the records to be viewed, and exported, reported, or exported.

The present invention provides three methods used by a dynamic web page to create content used in the database application: (1) A program at the web site creates application-specific dynamic web pages based on the data about the application in the data dictionary (these pages are created in the user's project directory whenever the structure of the database or application requirements change). These web pages do not need to refer to the data dictionary when the application is run. (2) The database application uses dynamic web pages which derive all of the information necessary to display the application's web pages from the data dictionary associated with the application. For this method, a standard set of dynamic web pages in the user's project directory read the data dictionary and dynamically create the application's content. (3) A final method uses a combination of the previous two—dynamic web pages are created specifically for the application, but these web pages still need to get information from the data dictionary when creating the web page displayed to the user.

An option in the database application allows the user to start the "application maintenance" module. The programs in this module allow the user to upload additional data, update the data dictionary and change the database structure. This includes, but is not limited to, changing the text or images that are to be displayed on the web forms and menus (for buttons, captions, labels, form titles, messages, etc.); changing the fonts and colors to be used to display text on the web forms; where the various items are to be displayed on the form; and specifying programming code that is to be executed when the web application is run.

BRIEF DESCRIPTION OF THE DRAWINGS

Features of the present invention will be more apparent from the following description of the preferred embodiments with reference to the accompanying drawings, wherein:

FIGS. 3A–3G illustrate screen shots of the sequence used to sign up for the service and to upload an electronic copy the data;

FIGS. 8A–F illustrate screen shots of a data dictionary-driven database application;

DETAILED DESCRIPTION

In the following description, for purposes of explanation and not limitation, specific details are set forth, such as particular techniques, etc. in order to provide a thorough understanding of the present invention. However, it will be apparent to one skilled in the art that the present invention may be practices in other embodiments that depart from these specific details. In other instances, detailed descriptions of well-known methods are omitted so as not to obscure the description of the present invention. Web pages described in the present invention are, for the most part, dynamic.

Figure 1:
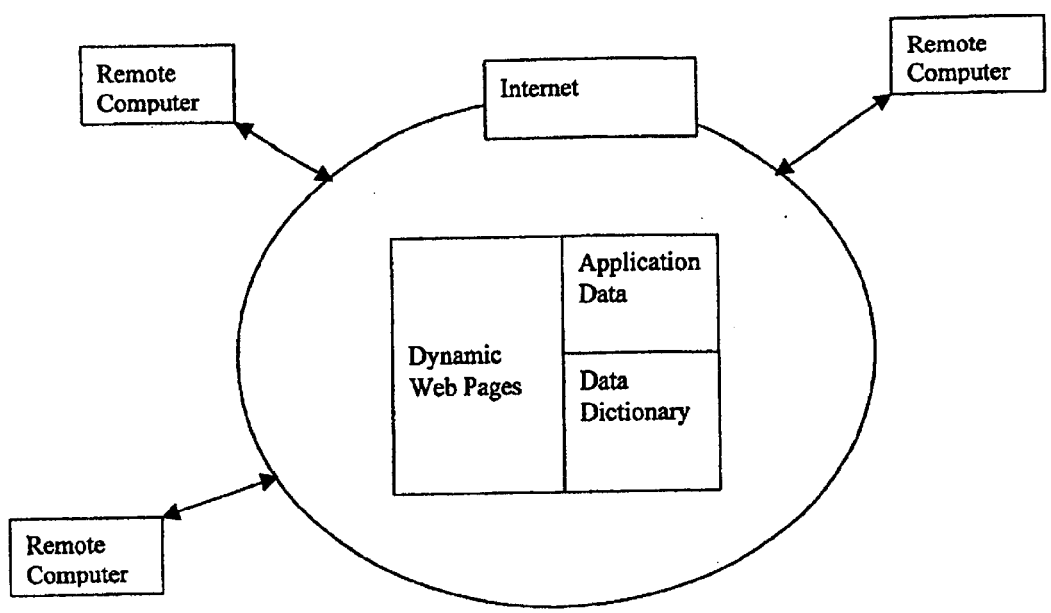
FIG. 1 illustrates the main components of a data dictionary-driven web-based database application.

A data dictionary-driven web-based database application is illustrated in FIG. 1 and includes a central web site, a plurality of computers and the internet. The central web site includes a data dictionary, application data, and dynamic web pages. Each of the plurality of computers is connected to the internet and runs web browsers to display the application's web pages. The internet connects the plurality of computers to the central web site.

Figure 2:
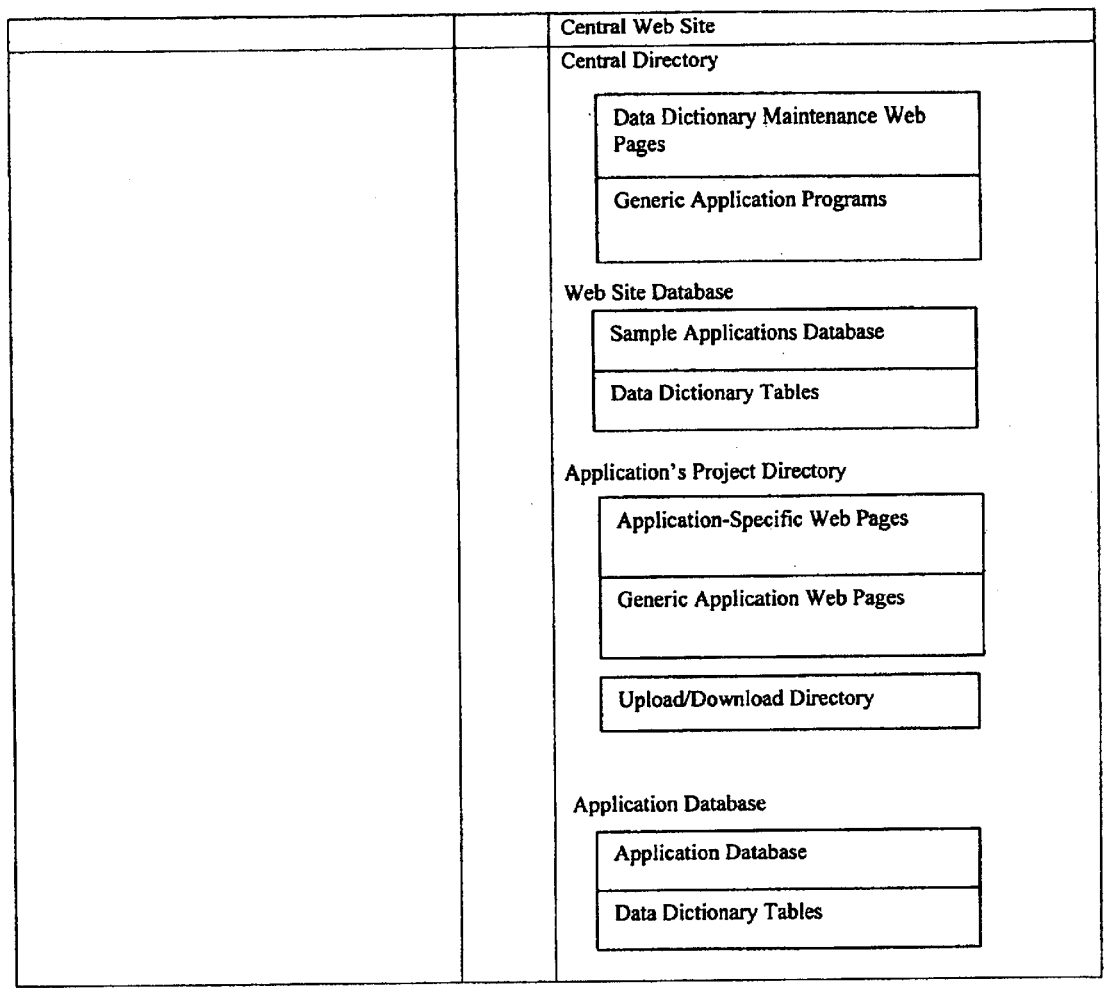
FIG. 2 illustrates the components of the system that are contained at the Web site.

The central web site, illustrated in FIG. 2, includes a central directory, a web site data base, an application project directory and an application database. The central directory includes common programs used in creating the database application pages (generic application programs) and maintaining the database requirements and structure (data dictionary maintenance Web programs). The web site data base contains sample applications and data dictionary tables that are used in displaying the web pages which are used to maintain the database requirements and structure. The application project directory (one directory for each project) contains application-specific web pages, generic application web pages, images for displaying on application pages, additional HTML code to be displayed on application web pages, and upload/download directory. The application database contains application data and data dictionary tables associated with the application.

Figure 3:
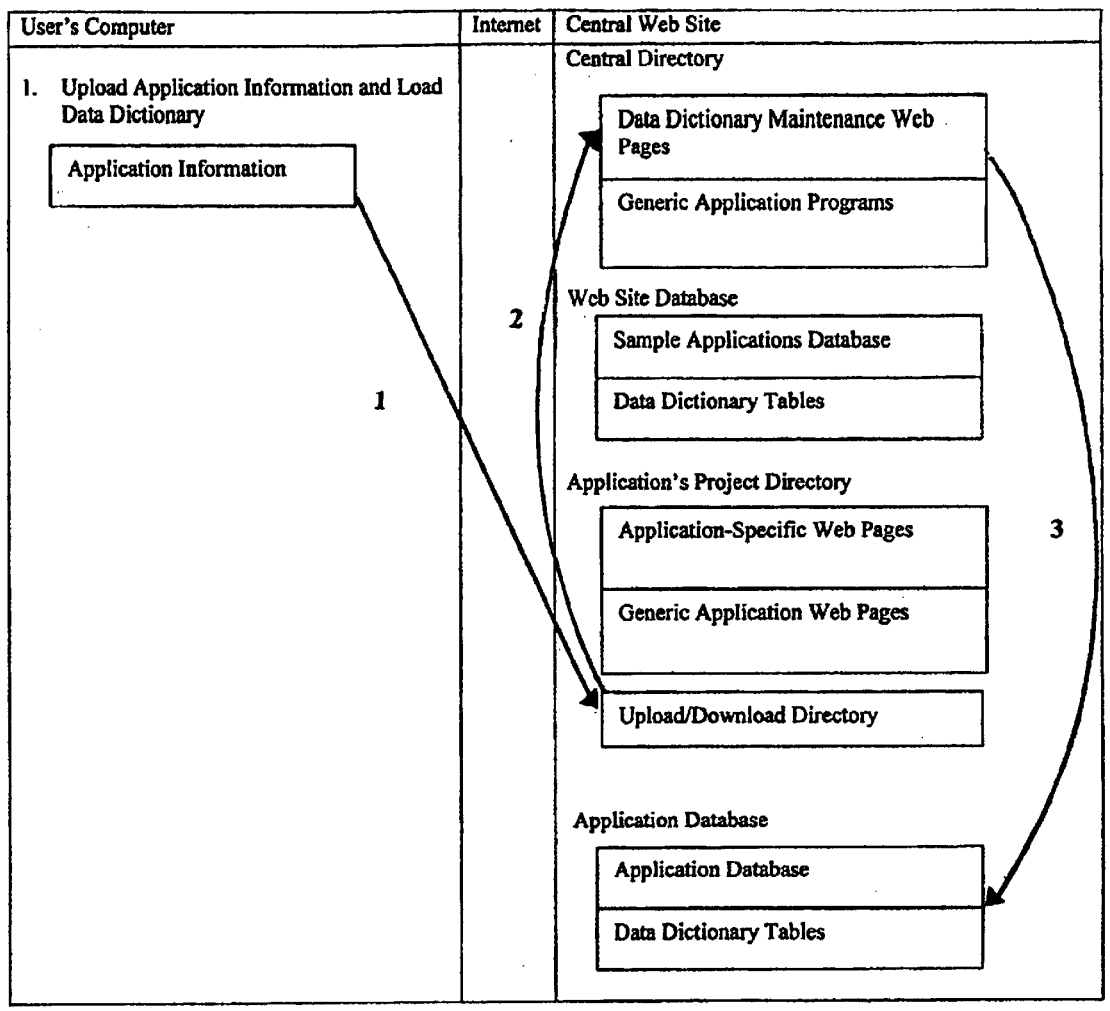
FIG. 3 illustrates the components used to initialize the data dictionary based on electronic data provided by the user.

The initialization of a data dictionary is illustrated in FIG. 3. Application information is uploaded to the central web site and information is loaded into a data dictionary based on the uploaded application information. The uploaded information is electronic information about the database. A user uploads (1) (or emails) files of electronic data to the central web site. An application program on the central web site reads the files (2) and enters information about the application into a data dictionary (3).

The electronic information can be in many forms, including PC-based databases (e.g., Microsoft's Access, FoxPro, dBase, Paradox, etc.), spreadsheets, and text files. The information for the data dictionary can be derived either from the database or spreadsheet (a Microsoft's Access MDB file contains information on table structures, required fields, etc.), or obtained explicitly from electronic data dictionary information. For example, a spread sheet could contain "sheets" for each table, and each "sheet" could contain information about the fields of the corresponding table, etc.

Figure 3E:
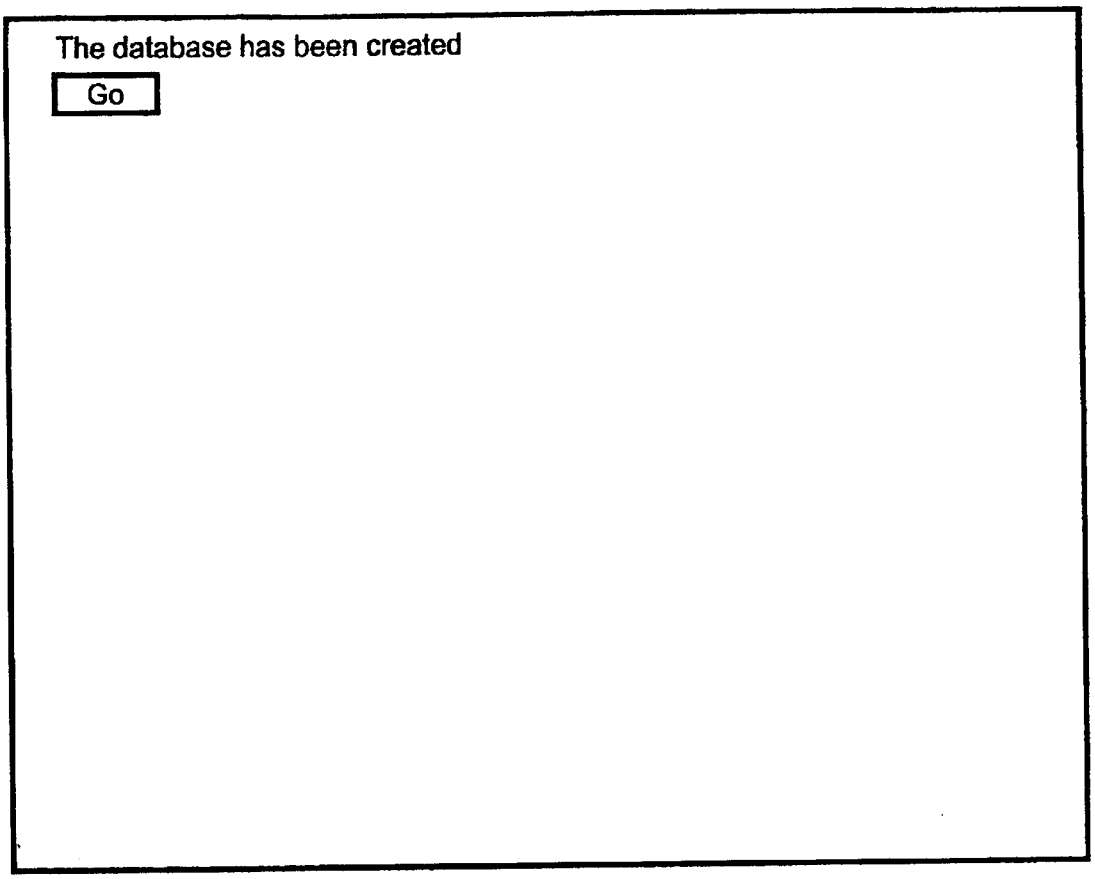

The process of signing up for a service and uploading an electronic copy of data is illustrated in FIGS. 3A to 3G. A central web site provides web pages which step or guide a user through the uploading process. A user signs up for service as a new customer (FIG. 3A) and enters information about his/her company (FIG. 3B). The user selects a method for creating the web-based application (uploading a file, creating an application from a template, or starting with an empty database) (FIG. 3C). The central web site creates an account for the user (insuring that the information was filled out properly) (FIG. 3D). The central site also creates a directory for the application, copies in the web pages needed to run the user's application, and creates an empty database (FIG. 3E). The user selects the file to be used to create the application (FIG. 3F), and, the file is uploaded to the central Web site (FIG. 3G). The system reads the uploaded file, determines the database structure, and updates the data dictionary with the information gleaned from the uploaded file. For example, from an Access MDB, the system can determine the name of each table, the name of each field in each table, the specifications of each field (e.g., required, default value, type, size, mask, etc.), the name of each index (and the corresponding fields), and the relationships among the various tables. From a text file (which has the field names in the first record), the system can determine the name of the table, the name of each field in each table, some of the specifications of each field (e.g., type, size, number of decimal places).

Figure 4:
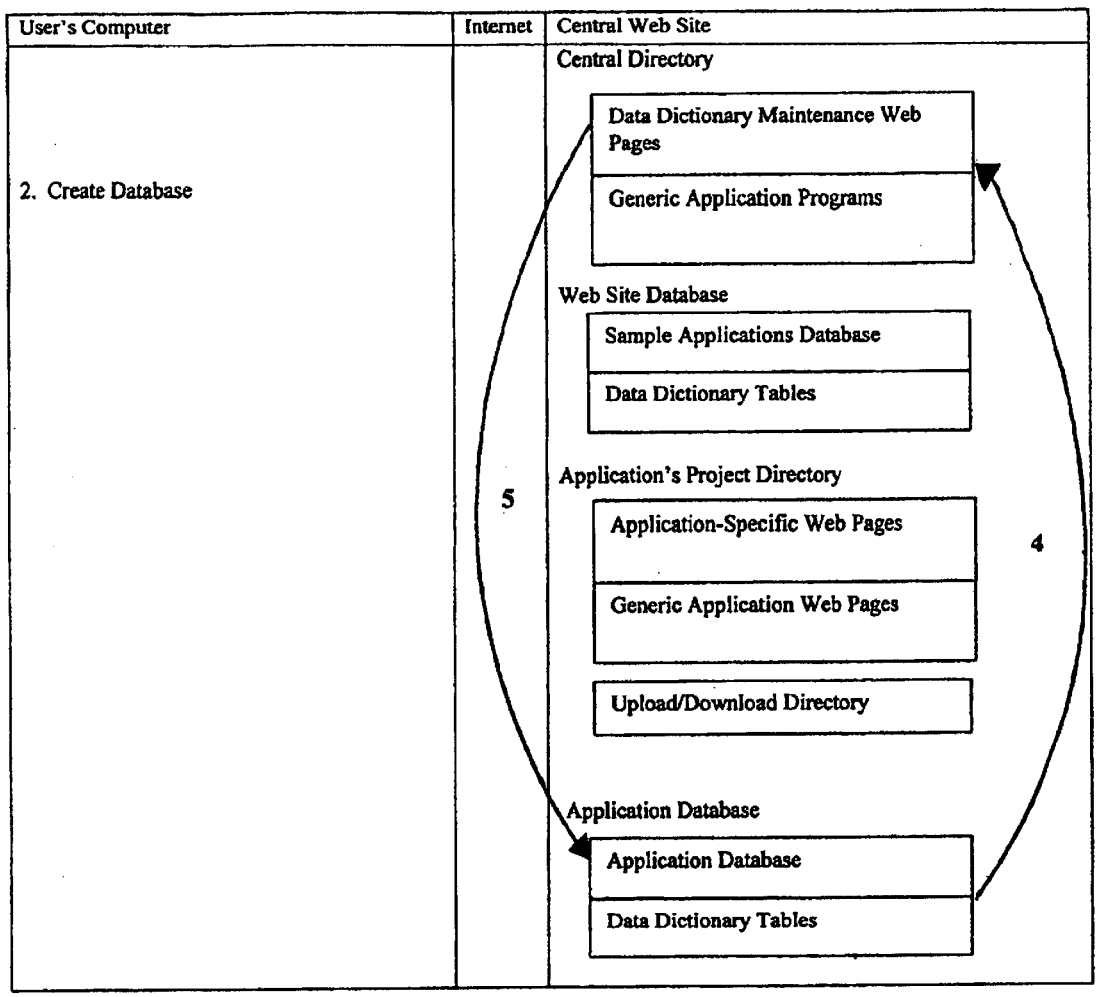
FIG. 4 illustrates the components used to create the user's database based on the data dictionary.

A database for an application is created as illustrated in FIG. 4. An application program on the central web site reads the data dictionary (4) and creates the database for the application (5). The database could be stored either on a database server (e.g., Oracle, Microsoft's SQL Server, etc.) or on a file server (e.g., Microsoft's Access or FoxPro). It should be noted that if the files that the user uploaded are to be accessed directly by the web application, this step is not necessary.

Figure 5:
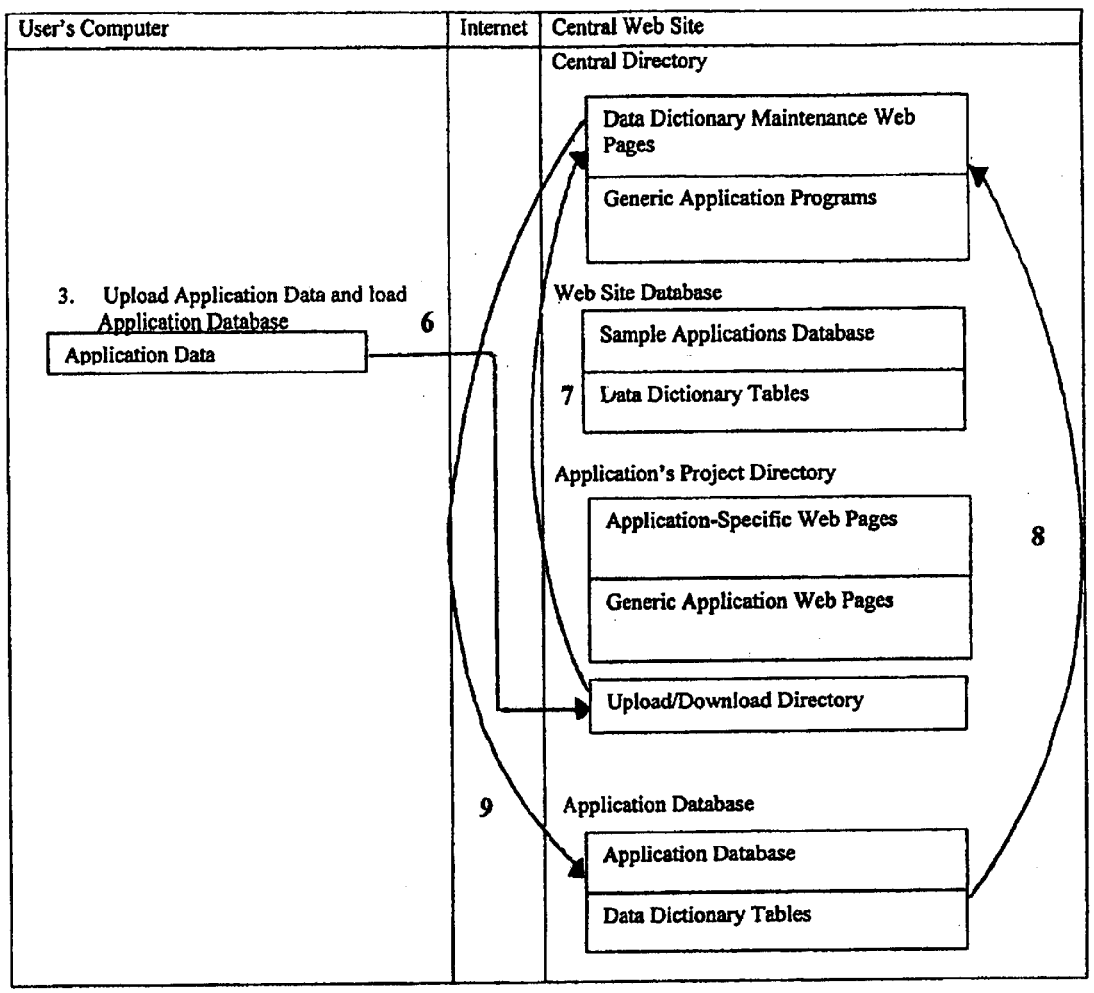
FIG. 5 illustrates the components used to upload the user's data and load the data into the Web site's database.

The uploading of a database for an application is illustrated in FIG. 5. A user uploads the files (6) of electronic data to the central web site (when the user signs up for service, the upload in this step is the same as the upload shown in FIG. 3, step 1. This step allows for the user to upload electronic data after the application has been created). An application program on the central web site reads the files (7) and the data dictionary (8) and updates the application's database (9). The electronic data can be in PC-based databases, spreadsheets, text files, or other electronic formats.

Figure 6:
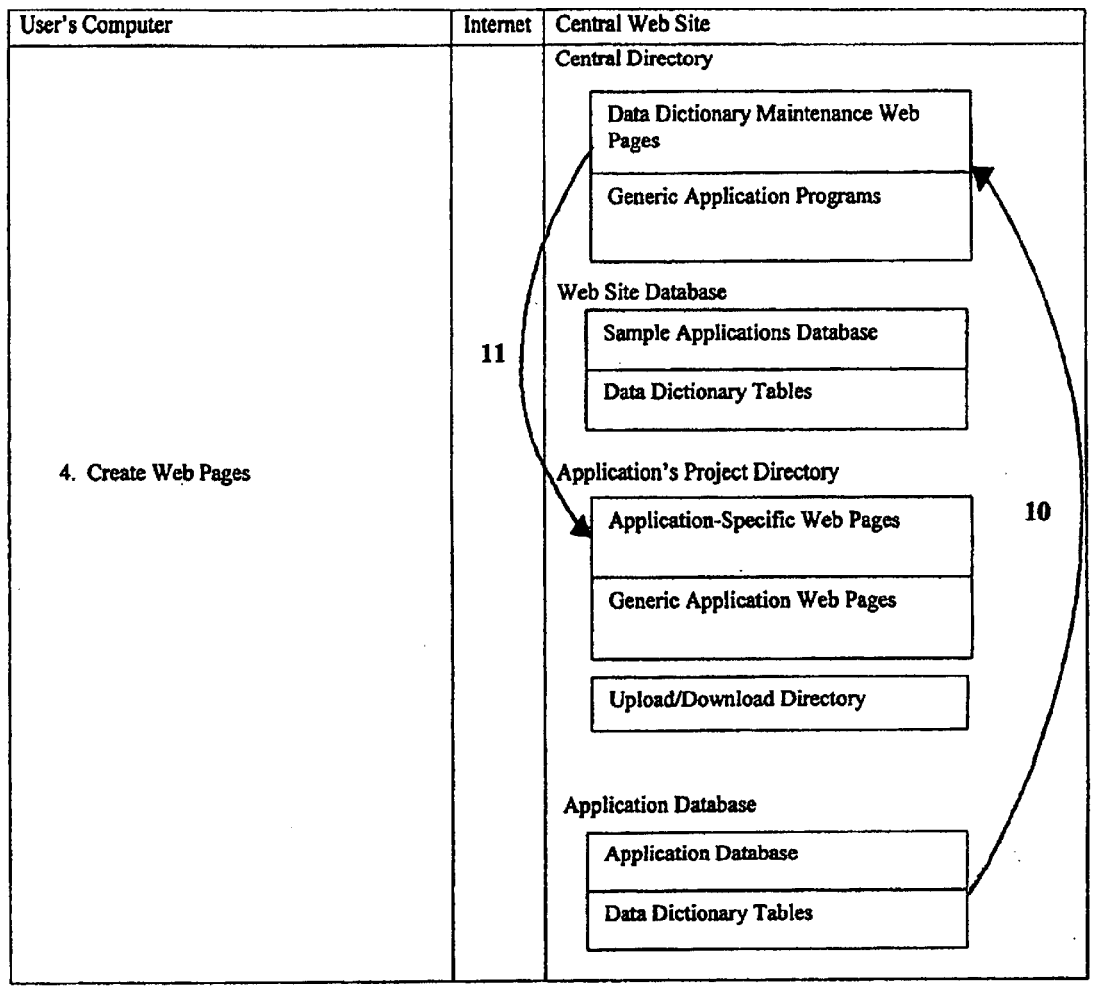
FIG. 6 illustrates the components used to create the web pages for the application.

Creation of web pages for a web application is illustrated in FIG. 6. An application program on the central web site reads the data dictionary (10) and creates the web pages (11) that will be used to run the application on the central web site.

Figure 7:
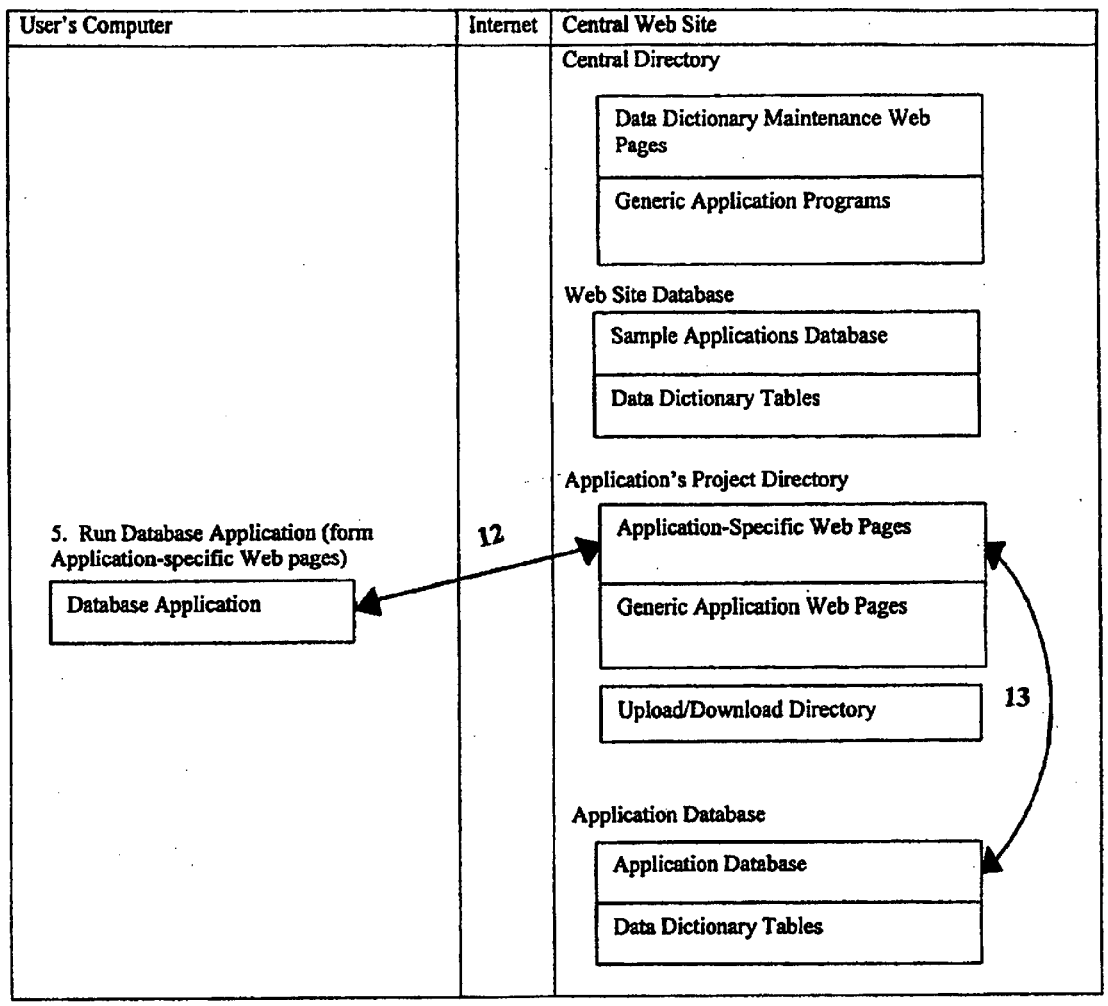
FIG. 7 illustrates the components used to run the database application from the application-specific Web pages.

The running of an application from the generated pages is illustrated in FIG. 7. The user is provided the URL for the web site. When the user enters the URL in a web browser (12), the main menu for the application is displayed. The user can then select application components to be run and view/change data in the database (13). The data dictionary was used to create the pages for the application but is not used by the application's pages. The sample pages displayed to the users are illustrated in FIGS. 8A–8D.

Figure 8:
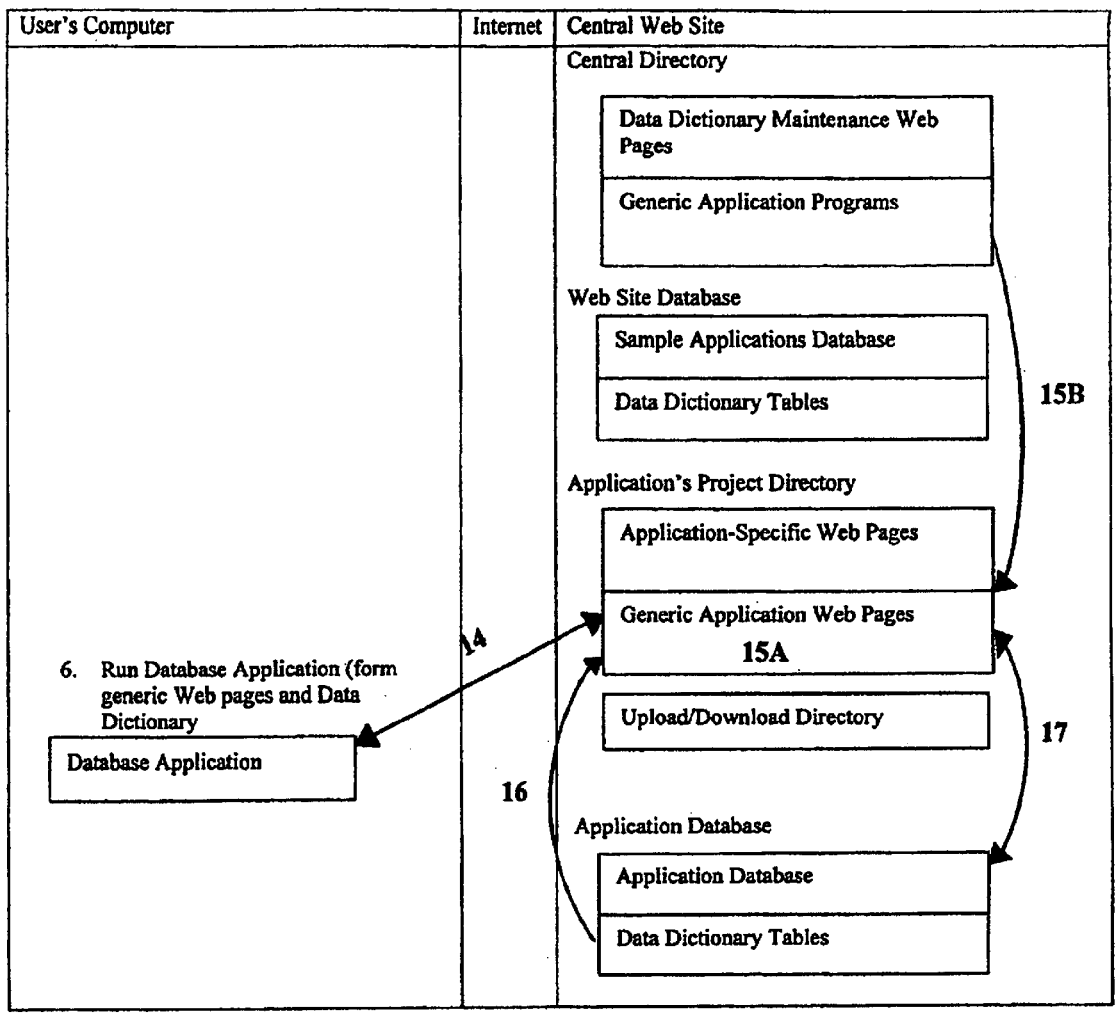
FIG. 8 illustrates the components used to run the database application from the data dictionary.

The running of the application from the data dictionary is illustrated in FIG. 8. The user is provided the URL for a web site. When the user enters the URL in a web browser (14), an application program on the central web site (15A, 15B) reads the data dictionary (16) and generates all of the web pages for the application (menus, selection criteria, data, and reports, etc.) as the user requests them, allowing the user to view/change data in the database (17). A web-based application consists of the following components illustrated in FIGS. 8A to 8F.

Figure 8A:
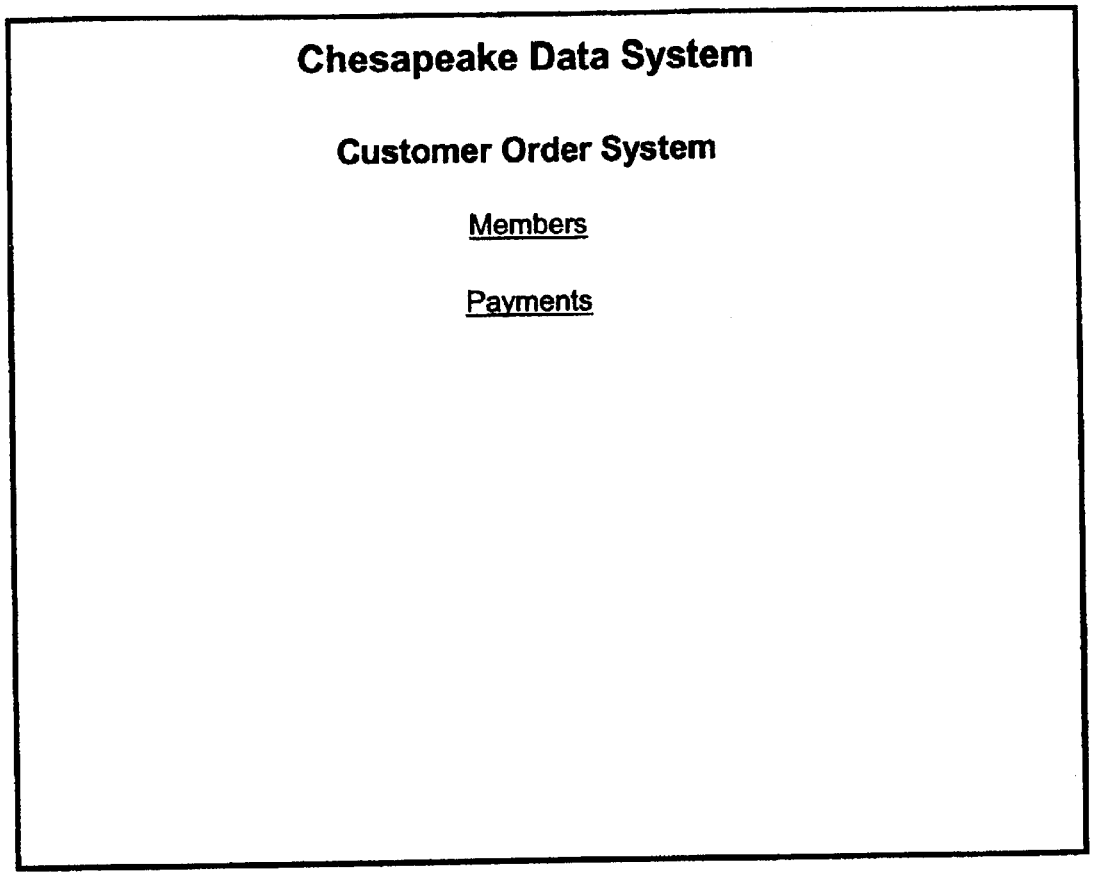

A menu for allowing the user to select the table to be viewed/changed (FIG. 8A). (The list of tables on the menu is based on the records in the "tWebTable" data dictionary where the "table type" field has the value "Primary"). A "list form" that lists a subset of records in the selected table (FIG. 8B). From the list form, the user can specify another subset of record to be displayed, sort the records by any of the column headings, change the number of records displayed on the list form, select a record to view in detail (where it's data can be changed), or display another form (filter, export, report, or new). A "filter form" that allows the user to select the records to be displayed or reviewed (FIG. 8C). A "record form" that allows the user do view the detail for each record, including data in child tables (FIG. 8D). An "export form" that allows the user to export data (FIG. 8E). A "report form" that allows the user to select a report to be run and to specify several aspects of how the report is to be displayed (FIG. 8F).

Figure 9:
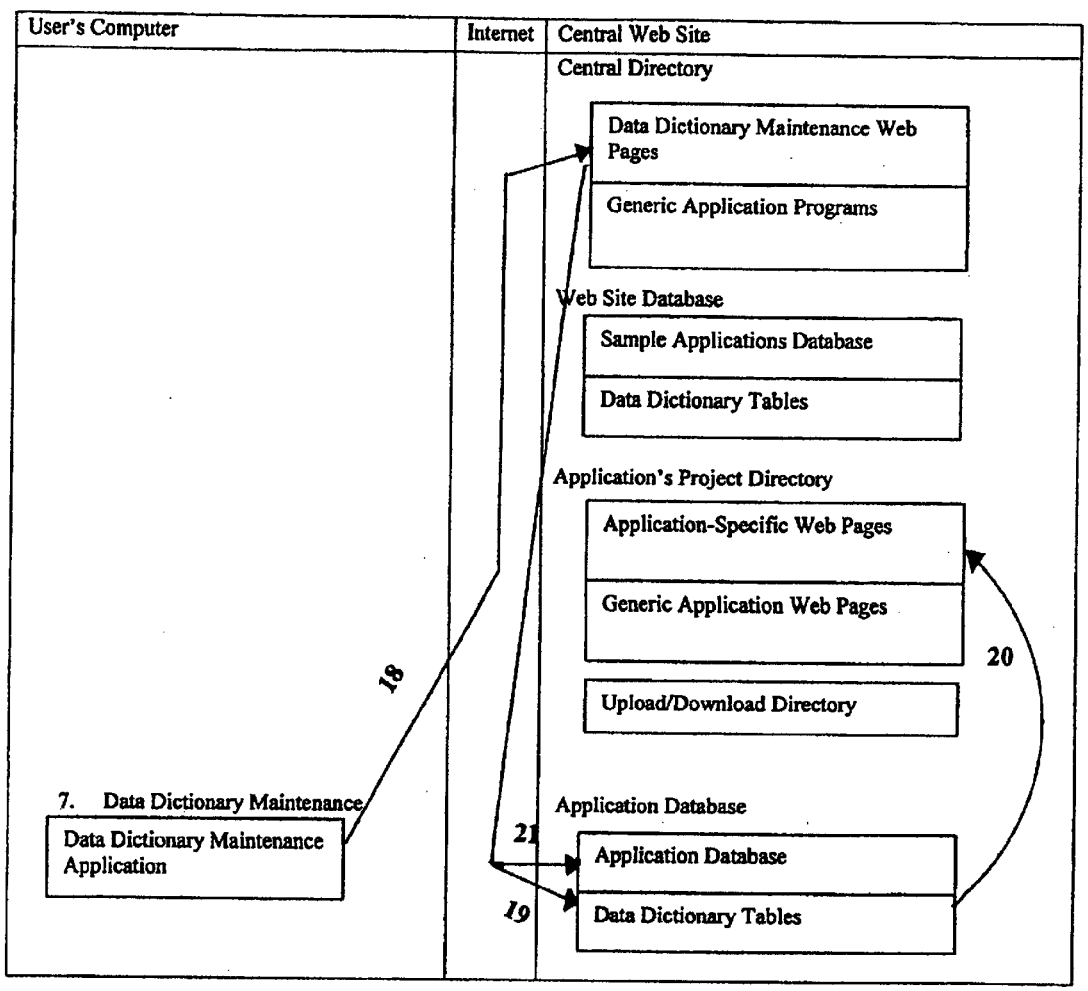
FIG. 9 illustrates the components used to maintain the data dictionary and user's database.

The maintenance of a data dictionary according to exemplary embodiments of the present invention is illustrated in FIG. 9. The user starts the data dictionary maintenance application by selecting the "Admin" button on any "List Form" (18). The programs used in this service allow the user to modify all of the items outlined above: the web application's database structure, database characteristics, web application's components, the text or images that are to be displayed on the web forms and menus, the fonts and colors to be used to display text on the Web forms, where the various items are to be displayed on the form, and programming code that is to be executed when the web application is run. After the user updates the data dictionary (19), the application's web pages are re-generated (20) or the application's database structure is changed (21).

Figure 9K:
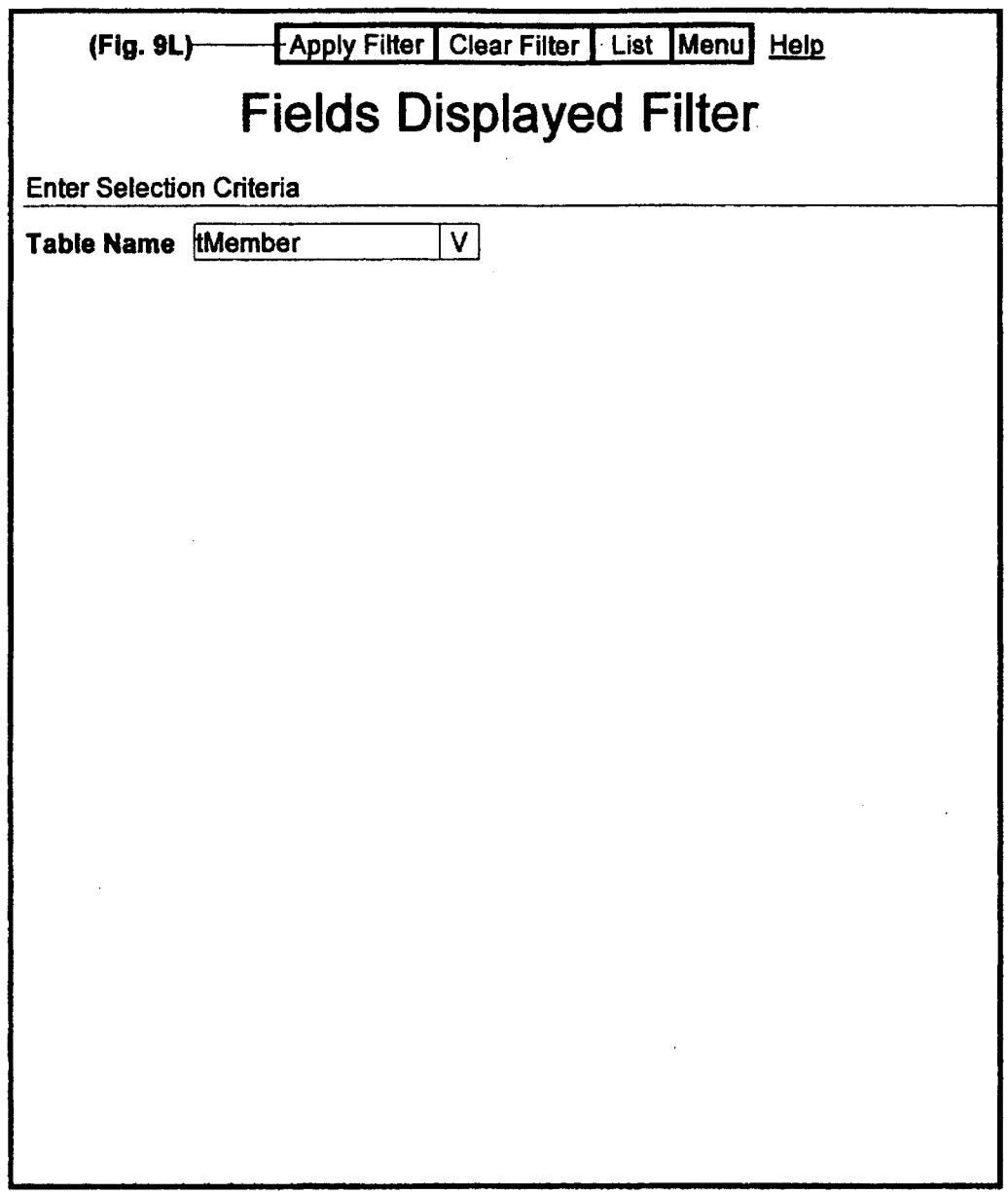
FIGS. 9A–9J illustrate the screen shots of the various ways the data dictionary and user's database can be maintained.
Figure 9A:
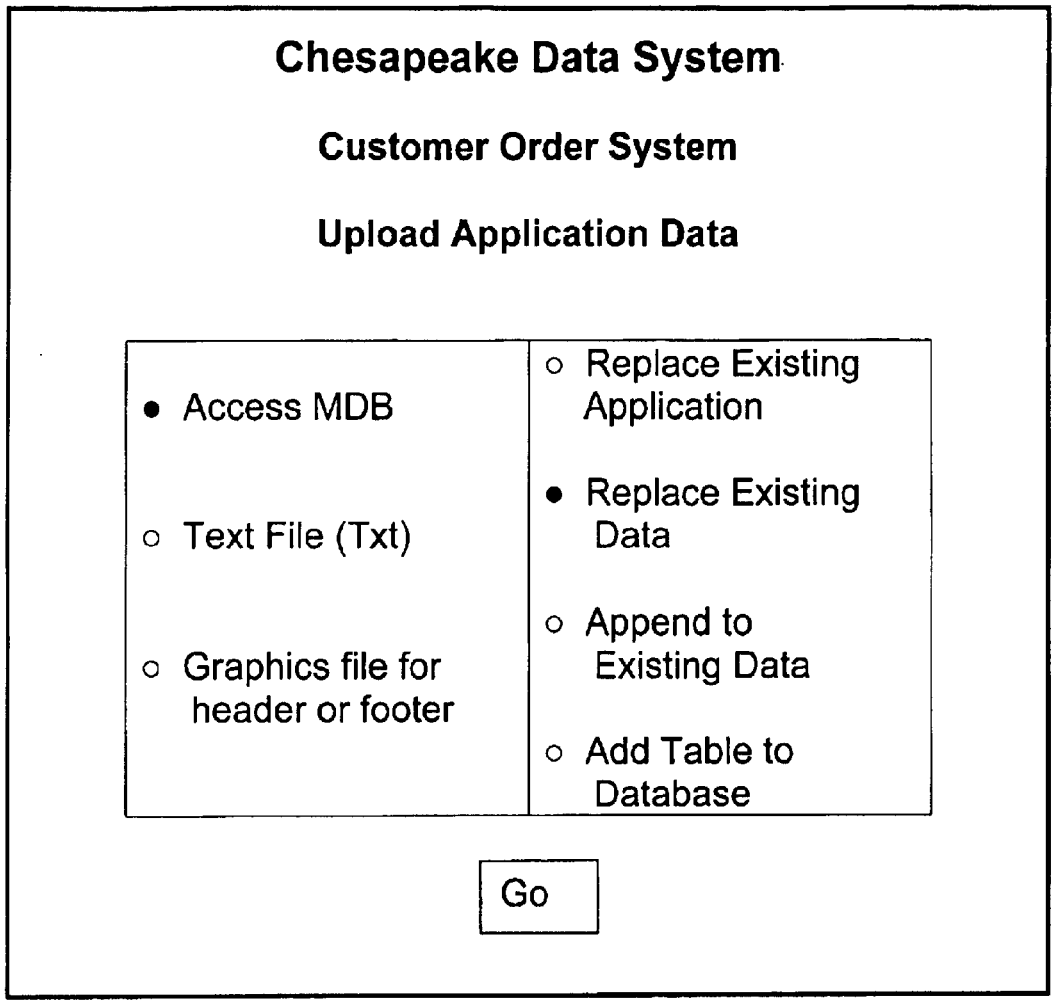

FIGS. 9A–9AK illustrate the various menu options and forms that are used to maintain the data dictionary and the structure of the application's database. (Note: where appropriate, each figure shows the figure which will be displayed when the indicated hyperlink or button is selected.)

In order to provide security, the user is first prompted for the "Pin" that allows the user to "administer" the system (FIG. 9A). The main "Web Applications Maintenance" menu (FIG. 9B) enables the user to select the type of maintenance that is to be done. Clicking on a menu option (e.g., "Lookup Tables") displays the next level of menus (e.g., "Lookup Tables"—FIG. 9C). The "Lookup Tables" menu (FIG. 9C) displays links for each lookup table in the application (specified by the value "Lookup" in the "table type" field of the "tWebTable" data dictionary table). When the user selects a table, the system will display forms similar to those shown in FIGS. 8B–8F. The "Application Specifications Maintenance" menu (FIG. 9D) is used to change those aspects of the application which are not related to the structure of the application's database. Clicking on a menu option (e.g., "Site Information") displays form which allows the user to change the indicated specifications (e.g., "Site Information"—FIG. 9E). The "Web Site Information Entry/Edit" form (FIG. 9E) allows the user to specify/change the name of the organization, the name of the application, etc. The "Applications Tables List" form (FIG. 9F) allows the user to specify the name that will be displayed for each table, the type of each table, the security level required to access each table, etc.

When the user selects "Application Table Indices" from the "Application Specifications Maintenance" menu (see FIG. 9D), the "Table Indices Filter" form (FIG. 9G) is displayed, enabling the user to specify for which table the index information is to displayed. The "Table Indices List" form (FIG. 9H) displays information about each index for the selected table and allows the user to specify the name of the index and the order in which it will be displayed. When the user selects "Lookup Fields For Pick Lists" from the "Application Specifications Maintenance" menu (see FIG. 9D), the "Lookup Fields Filter" form (FIG. 9I) is displayed, enabling the user to specify for which table the lookup information is to displayed. The "Lookup Fields List" form (FIG. 9J) displays each field in the selected table and allows the user to specify the key field for the table and the fields that will be displayed in pick lists on the various forms. When the user selects "Fields Displayed On Forms" from the "Application Specifications Maintenance" menu (see FIG. 9D), the "Fields Displayed Filter" form (FIG. 9K) is displayed, enabling the user to specify for which table the field display information is to displayed. The "Fields Displayed List" form (FIG. 9H) displays each field in the selected table and allows the user to specify which fields are displayed on each form, the order in which the fields are to be displayed, the spacing for each field on the "Record" and "Filter" forms, etc. When the user selects "Fields Captions" from the "Application Specifications Maintenance" menu (see FIG. 9D), the "Fields Captions Filter" form (FIG. 9M) is displayed, enabling the user to specify for which table the field caption information is to displayed. The "Fields Captions List" form (FIG. 9H) displays each field in the selected table and allows the user to specify the captions to be displayed on each form.

When the user selects "Fields Specifications" from the "Application Specifications Maintenance" menu (see FIG. 9D), the "Fields Specifications Filter" form (FIG. 9O) is displayed, enabling the user to specify for which table the field specification information is to displayed. The "Fields Specifications List" form (FIG. 9H) displays each field in the selected table and allows the user to specify whether a field can be updated, if the field is required, the default value, the display size, etc. The "Web Application Maintenance—Buttons and Colors" menu (FIG. 9Q) allows the user to select which set of buttons or colors to change. (FIG. 9Q indicates the figures corresponding to each menu choice).

The "Button Text—List Form Entry/Edit" form (FIG. 9R) allows the user to specify the text, tool tip, and picture associated with the buttons on the "List Form". The "Button Text—Record Form Entry/Edit" form (FIG. 9S) allows the user to specify the text, tool tip, and picture associated with the buttons on the "Record Form". The "Button Text—Filter Form Entry/Edit" form (FIG. 9T) allows the user to specify the text, tool tip, and picture associated with the buttons on the "Filter Form". The "Button Text—Other Form Entry/ Edit" form (FIG. 9U) allows the user to specify the text, tool tip, and picture associated with the buttons on the "New Form" and "Export Form".

The "Web Color Parameters List" form (FIG. 9V) allows the user to select a record which specifies the colors for one of the components the application. The "Web Color Parameters Entry/Edit" form (FIG. 9W) allows the user to specifies the colors for one of the components the application. The "Change Database Structure" menu (FIG. 9X) allows the user to change the structure of the application's database (add tables, add fields, etc)(FIG. 9X indicates the figures corresponding to each menu choice).

Selecting the "Add Tables From System-Wide Data Dictionary" menu option displays the "Add Table List" form (FIG. 9Y). The user then selects which tables to be added from the system-wide data dictionary. The user can also specify that the sample data is to be copied to the application's database. Selecting the "Add A Table" menu option displays the "Add Table Entry/Edit" form (FIG. 9Z). When the user clicks the "Insert" button the data about the table is saved in the data dictionary (the table cannot be created until the fields are specified in the next step). Selecting a "Change Table Structure . . . " menu option displays the "Field Specifications Filter" form (FIG. 9AA), which allow the user to select the table whose structure will be changed. When the user selects the "Apply Filter" button, the form in FIG. 9AB will be displayed.

The "Field Specifications List" form (FIG. 9AA) allows the user to change the structure of a table in the database. For each new or existing field, the user can specify the field type, field size, index type, and the lookup table associated with the field (if any). When the user selects the "Save" button, the system changes the database structure of the table, indices, and/or relationships. Selecting the "Remove Tables" menu option displays the "Remove Tables List" form (FIG. 9AC). When the user selects the "Save" button, the system will delete the tables selected by the user. Selecting the "Remove Fields" menu option displays the "Remove Fields Filter" form (FIG. 9AD), which allow the user to select the table from which fields will be deleted. When the user selects the "Apply Filter" button, the form in FIG. 9AD will be displayed.

The "Remove Fields List" form (FIG. 9AE) allows the user to specify the fields to be removed from the selected table. When the user selects the "Save" button, the system will change the table structure and remove the selected fields. The system will also remove any indices and relationships associated with the deleted fields. Selecting the "Remove Indices" menu option displays the "Remove Indices Filter" form (FIG. 9AF), which allow the user to select the table from which indices will be deleted. When the user selects the "Apply Filter" button, the form in FIG. 9AG will be displayed.

The "Remove Indices List" form (FIG. 9AG) allows the user to specify the indices to be removed from the selected table. When the user selects the "Save" button, the system will change the table structure and remove the selected indices. The system will also remove any relationships associated with the deleted indices.

Selecting the "Remove Relationships" menu option displays the "Remove Relationships Filter" form (FIG. 9AH), which allow the user to select the table from which relationships will be deleted. When the user selects the "Apply Filter" button, the form in FIG. 9AI will be displayed. The "Remove Relationships List" form (FIG. 9AI) allows the user to specify the relationships to be removed from the selected table. When the user selects the "Save" button, the system will remove the selected relationships. The "Upload Application Data" form FIG. 9AJ allows the user to upload electronic information (an Access MDB or text file) which contains information that can be used to (1) replace the existing application, (2) replace the existing data, (3) append the data to the corresponding tables, or (4) add new tables to the database. The form also allows the user to upload graphics that will be displayed on the Web pages for the application.

Figure 10:
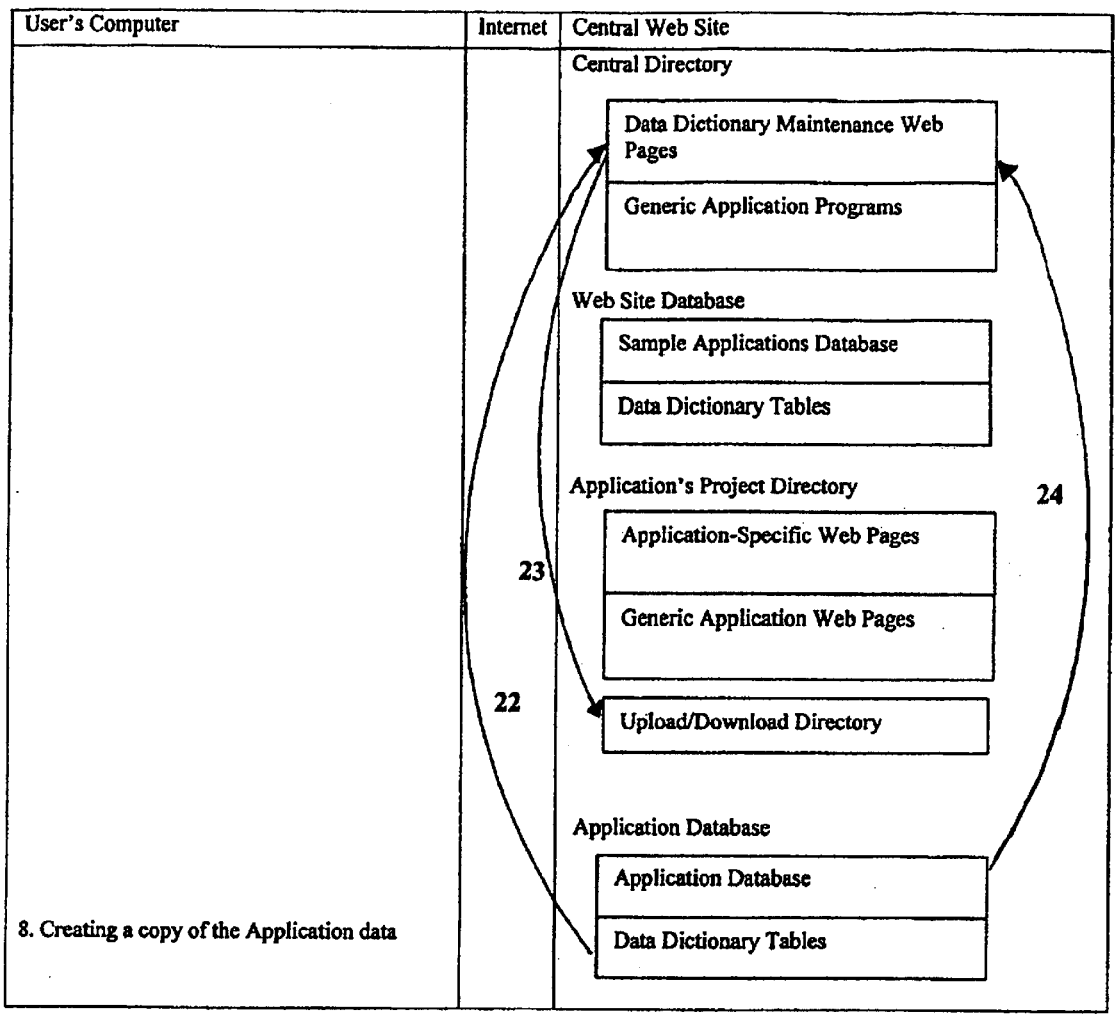
FIG. 10 illustrates the components used to create a copy of the application data.

The creation of a copy of the application data for downloading is illustrated in FIG. 10. An application program on the central Web site reads the data dictionary (22) and creates a Microsoft Access MDB (in the Upload/Download directory)(23) with all of the tables in the application's database (data dictionary tables are not included). Another program then copies the data from the application's database to the Access database (24). The user can then download the Access database.

Figure 11:
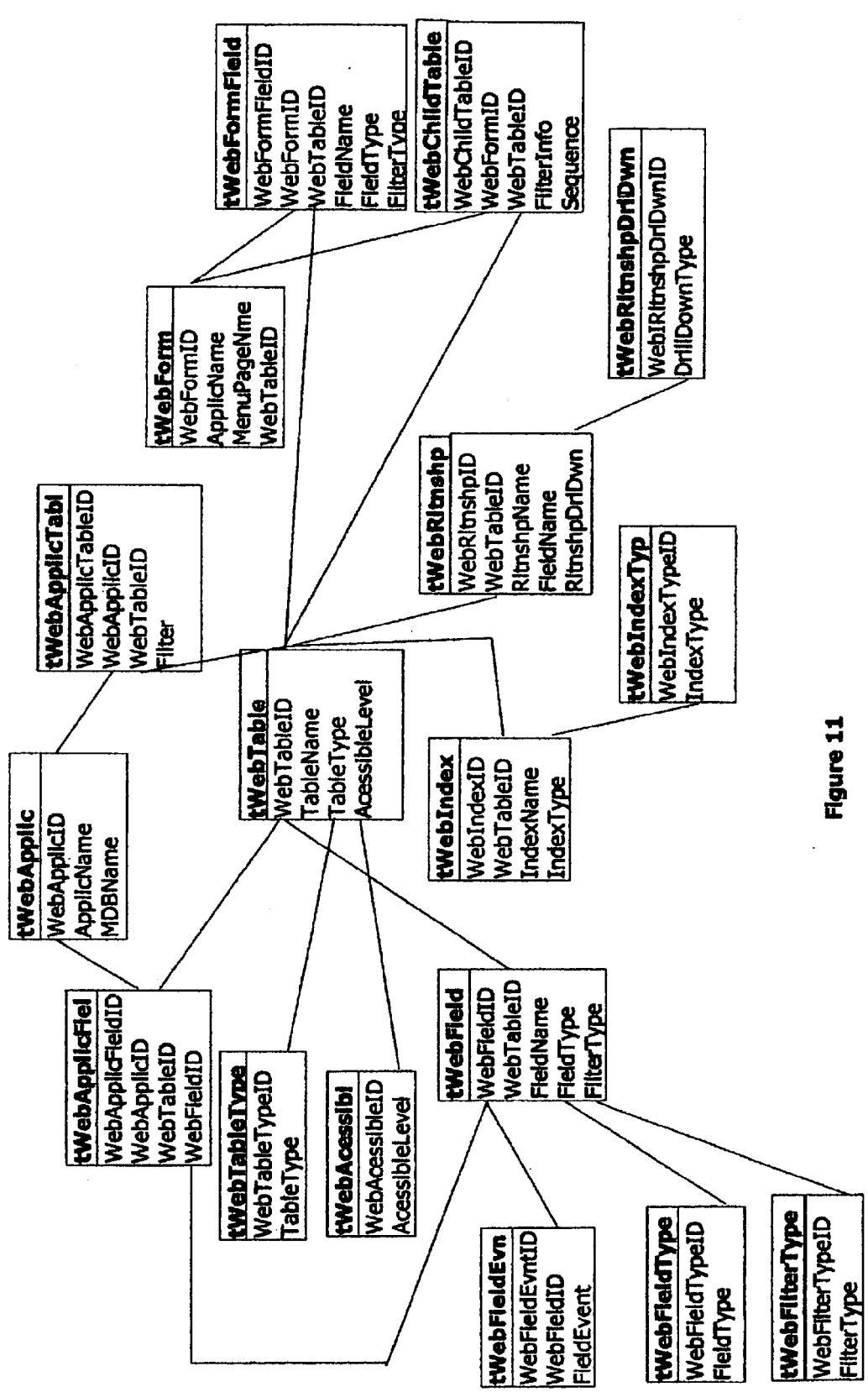
FIG. 11 illustrates the various tables in the data dictionary and how they are related.

Tables in the data dictionary are illustrated in FIG. 11. The data dictionary consists of many inter-related tables. They are described below:

| | |
|---|---|
| Tables | One record for each - the name of the table, the text to display on Web forms when referring to the table, the security level required for user access to the table, etc |
| Table Types | Categorizes the tables in the application ("primary", "detail", etc.) |
| Fields | One record for each field in each table - the name of the field, the text to display on Web forms when referring to the field, the security level required for user access to the field, the field type, etc |
| Field Type | Types of fields in the database ("numeric", "date", "character", etc.) |
| Index Type | Type of index for a field ("unique" or "indexed") |
| Filter Type | Type of filter for the field on the filter form "number", "range", "word", etc. |
| Field Events | Specifies the code to be executed when an "event" (e.g., data changed) associated with the field is "triggered" |
| Index | One record for each index for each table (name of index, fields in the index, sorted ascending, etc) |
| Relationship | One record for each relationship between two tables (names of the tables, fields in the relationship, type of relationship, etc.) |
| Accessible | Security level required to display a table or field ("Read", "Update", "Administer" or "None") |
| Relationship Drill Down | Specifies the which "drill down" buttons are to be displayed for child tables when a primary record is displayed |
| Forms | One record for each of the forms used in the "Applications Maintenance" part of the system (can also be used to develop forms for an application). Specifies the initial form to be displayed, the buttons to be displayed, the default sort order, etc. |
| Form Fields | One record for each field on a form. Contains the same fields as the "Fields" table |
| Child Tables | For forms with child tables, contains information about how the data in the table is to be displayed, any "filter" information for the child table, etc. |
| Applications | One record for each sample application |
| Application Tables | One record for each table in each sample application |
| Application Fields | One record for each field in each table in each sample application |

The foregoing has described the principles, preferred embodiments and modes of operation of the present invention. However, the invention should not be construed as being limited to the particular embodiments described above. The above-described embodiments should be regarded as illustrative rather than restrictive, and it should be appreciated that variations may be made in those embodiments by those skilled in the art without departing from the scope of the present invention as defined by the following claims.

What is claimed is:

1. A network-based database system comprising:

a network interface adapted to receive application data, wherein said application data contains both data items and information regarding the structure and/or organization of said data items;

an engine for building and/or updating a data dictionary based, at least, on the data items of said application data received via said network interface;

an engine for building and/or updating and/or running an application, said application comprising at least one non-static application page; and storage for said received application data, said data dictionary, and said at least one non-static application page;

wherein said engine for building and/or updating and/or running said application employs information in said data dictionary and at least a portion of the data items of said application data to build and/or update and/or run said at least one non-static application page;

wherein said data dictionary contains at least information regarding the presentation of said data items on said non-static application page; and wherein said database system is adapted to permit a user to provide said application data by at least one method selected from the group consisting of: uploading a file, creating an application from a template, entering the structure and/or organization information of said data items on a form in a network-based computer application, and entering the structure and/or organization information of said data items on a form in a web browser or a network-based computer application.

2. A system as claimed in claim 1, wherein at least a portion of the data items of said received application data is in a format selected from the group consisting of: a text file, a binary file, a comma-delimited file, a Microsoft Access file, a FoxPro file, a dBase file, a Paradox file, a SQL server file, an Oracle file, a database application file, a Microsoft Excel file, a spreadsheet file, an HTML file, a schema file for a relational database, and a word processor file.

3. A system as claimed in claim 1, wherein at least one said non-static application page comprises and/or generates text and/or data in at least one format selected from the group consisting of: SGML, HTML, XML, Java, plain text, font data, color data, and graphic file data.

4. A system as claimed in claim 1, wherein said network is the Internet, a local area network, or a wide area network.

5. A system as claimed in claim 1, wherein said network interface is adapted to transmit said application pages to a user and/or to receive said application data through a web browser or a network-based computer application.

6. A system as claimed in claim 1, wherein said engine for building and/or updating and/or running said application is further adapted to permit a user using a web browser or a network-based computer application to effect the creation, modification, and/or deletion of said at least one non-static application page.

7. A system as claimed in claim 1, wherein said storage for the data items of said received application data comprises a database.

8. A system as claimed in claim 7, wherein said database system is adapted to permit a user to modify the structure, characteristics, and/or data of said database.

9. A system as claimed in claim 7, wherein said database comprises at least one component selected from the group comprising: a text file, a table for data storage, an index, and a relationship between a plurality of tables.

10. A system as claimed in claim 1, wherein at least one said non-static application page comprises at least one form selected from the group comprising: record form, new form, filter form, list form, export form, menu form, login form and report form.

11. A system as claimed in claim 1, wherein said storage comprises at least one storage device selected from the group consisting of: hard disk, floppy disk, magnetic storage medium, optical storage medium, memory, RAM, removable storage medium, smart card, flash memory, memory card storage, and semiconductor-based memory.

12. A system as claimed in claim 1, wherein said network interface is further adapted to transmit application pages to an end user for display and/or download and/or execution.

13. A method for providing a network-based database system comprising:

receiving application data, wherein said application data contains both data items and information regarding the structure and/or organization of said data items;

building and/or updating a data dictionary based, at least, on the data items of said application data; and building and/or updating and/or running an application comprising at least one non-static application page, based on information in said data dictionary and at least a portion of the data items of said application data;

wherein said data dictionary contains at least information regarding the presentation of said data items on said non-static application page; and further comprising permitting a user to provide said application data by at least one method selected from the group consisting of: uploading a file, creating an application from a template, entering the structure and/or organization of said data items on a form in a network-based computer application and entering the structure and/or organization of said data items on a form in a web browser or a network-based computer application.

14. A method as claimed in claim 13, wherein at least a portion of the data items of said received application data is in a format selected from the group consisting of: a text file, a binary file, a comma-delimited file, a Microsoft Access file, a FoxPro file, a dBase file, a Paradox file, a SQL server file, an Oracle file, a database application file, a Microsoft Excel file, a spreadsheet file, an HTML file, a schema file for a relational database, and a word processor file.

15. A method as claimed in claim 13, wherein at least one said non-static application page comprises and/or generates text and/or data in at least one format selected from the group consisting of: SGML, HTML, XML, Java, plain text, font data, color data, and graphic file data.

16. A method as claimed in claim 13, wherein said receiving step and/or said transmitting step is performed via the Internet, a local area network, or a wide area network.

17. A method as claimed in claim 13, wherein said application data is received through a web browser or a network-based computer application.

18. A method as claimed in claim 13, further comprising permitting a user using a web browser or a network-based computer application to effect the creation, modification, and/or deletion of said at least one non-static application page.

19. A method as claimed in claim 13, further comprising storing the data items of said received application data in a database.

20. A method as claimed in claim 19, further comprising permitting a user to modify the structure, characteristics, and/or data of said database.

21. A method as claimed in claim 19, wherein said database comprises at least one component selected from the group comprising: a text file, a table for data storage, an index, and a relationship between a plurality of tables.

22. A method as claimed in claim 13, wherein at least one said non-static application page comprises at least one form selected from the group comprising: record form, new form, filter form, list form, export form, menu form, login form and report form.

23. A method as claimed in claim 13, further comprising storing at least a portion of said application data and/or data dictionary in at least one storage device selected from the group consisting of: hard disk, floppy disk, magnetic storage medium, optical storage medium, memory, RAM, removable storage medium, smart card, flash memory, memory card storage, and semiconductor-based memory.

24. A method as claimed in claim 13, further comprising transmitting said at least one non-static application page to an end user for display and/or download and/or execution.

25. A network-based database system comprising instructions stored on a tangible medium, said instructions for:

receiving application data, wherein said application data contains both data items and information regarding the structure and/or organization of said data items;

building and/or updating a data dictionary based, at least, on the data items of said application data; and building and/or updating and/or running an application comprising at least one non-static application page, based on information in said data dictionary and at least a portion of said application data;

wherein said data dictionary contains at least information regarding the presentation of said data items on said non-static application page; and further comprising instructions to permit a user to provide application data by at least one method selected from the group consisting of: uploading a file, creating an application from a template, entering the structure and/or organization of said data items on a form in a network-based computer application, and entering the structure and/or organization of said data items on a form in a web browser or a network-based computer application.

26. A system as claimed in claim 25, wherein at least a portion of the data items of said received application data is in a format selected from the group consisting of: a text file, a binary file, a comma-delimited file, a Microsoft Access file, a FoxPro file, a dBase file, a Paradox file, a SQL server file, an Oracle file, a database application file, a Microsoft Excel file, a spreadsheet file, an HTML file, a schema file for a relational database, and a word processor file.

27. A system as claimed in claim 25, wherein at least one said non-static application page comprises and/or generates text and/or data in at least one format selected from the group consisting of: SGML, HTML, XML, lava, plain text, font data, color data, and graphic file data.

28. A system as claimed in claim 25, further comprising instructions for receiving and/or transmitting data via the Internet, a local area network, or a wide area network.

29. A system as claimed in claim 25, wherein said application data is received through a web browser or a network-based computer application.

30. A system as claimed in claim 25, further comprising instructions to permit a user using a web browser or a network-based computer application to effect the creation, modification, and/or deletion of said at least one non-static application page.

31. A system as claimed in claim 25, further comprising instructions for storing the data items of said received application data in a database.

32. A system as claimed in claim 31, further comprising instructions for permitting a user to modify the structure, characteristics, and/or data of said database.

33. A system as claimed in claim 31, wherein said database comprises at least one component selected from the group comprising: a text file, a table for data storage, an index, and a relationship between a plurality of tables.

34. A system as claimed in claim 25, wherein at least one said non-static application page comprises at least one form selected from the group comprising: record form, new form, filter form, list form, export form, menu form, login form and report form.

35. A system as claimed in claim 25, further comprising storage for at least a portion of said application data and/or said data dictionary, said storage comprising at least one storage device selected from the group consisting of: hard disk, floppy disk, magnetic storage medium, optical storage medium, memory, RAM, removable storage medium, smart card, flash memory, memory card storage, and semiconductor-based memory.

36. A system as claimed in claim 25, further comprising instructions for transmitting said at least one non-static application page to an end user for display and/or download and/or execution.

37. A method for providing a network-based database system comprising:

receiving application data, wherein said application data contains data items and does not contain information regarding the structure and/or organization of said data items;

determining and storing in a data dictionary the structure and/or organization of the data items of said application data; and building and/or updating and/or running an application comprising at least one non-static application page, based on the determined structure and/or organization of the data items stored in said data dictionary and at least a portion of said data items;

wherein said data dictionary contains at least information regarding the presentation of said data items on said non-static application page; and further comprising permitting a user to provide application data by at least one method selected from the group consisting of: uploading a file, creating an application from a template, entering structure and/or organization information of the data items on a form in a network-based computer application, and entering structure and/or organization information of the data items on a form in a web browser or a network-based computer application.

38. A method as claimed in claim 37, wherein at least a portion of the data items of said received application data is in a format selected from the group consisting of: a text file, a binary file, a comma-delimited file, a Microsoft Access file, a FoxPro file, a dBase file, a Paradox file, a SQL server file, an Oracle file, a database application file, a Microsoft Excel file, a spreadsheet file, an HTML file, a schema file for a relational database, and a word processor file.

39. A method as claimed in claim 37, wherein at least one said non-static application page comprises and/or generates text and/or data in at least one format selected from the group consisting of, SGML, HTML, XML, Java, plain text, font data, color data, and graphic file data.

40. A method as claimed in claim 37, wherein said receiving step and/or said transmitting step is performed via the Internet, a local area network, or a wide area network.

41. A method as claimed in claim 37, wherein said application data is received through a web browser or a network-based computer application.

42. A method as claimed in claim 37, further comprising permitting a user using a web browser or a network-based computer application to effect the creation, modification, and/or deletion of said at least one non-static application page.

43. A method as claimed in claim 37, further comprising storing the data items of said received application data in a database.

44. A method as claimed in claim 43, further comprising permitting a user to modify the structure, characteristics, and/or data of said database.

45. A method as claimed in claim 43, wherein said database comprises at least one component selected from the group comprising: a text file, a table for data storage, an index, and a relationship between a plurality of tables.

46. A method as claimed in claim 37, wherein at least one said non-static application page comprises at least one form selected from the group comprising: record form, new form, filter form, list form, export form, menu form, login form and report form.

47. A method as claimed in claim 37, further comprising storing at least a portion of said application data and/or data dictionary in at least one storage device selected from the group consisting of: hard disk, floppy disk, magnetic storage medium, optical storage medium, memory, RAM, removable storage medium, smart card, flash memory, memory card storage, and semiconductor-based memory.

48. A method as claimed in claim 37, further comprising transmitting said at least one application page to an end user for display and/or download and/or execution.

49. A network-based database system comprising:

a network interface adapted to receive application data, wherein said application data contains data items and does not contain information regarding the structure and/or organization of said data items;

an engine for determining and storing in a data dictionary the structure and/or organization of the data items of said application data received via said network interface;

an engine for building and/or updating and/or running an application, said application comprising at least one non-static application page; and storage for said received application data and said at least one non-static application page;

wherein said engine for building and/or updating and/or running said application employs said determined structure and/or organization of the data items stored in said data dictionary and at least a portion of the data items of said application data to build and/or update and/or ran said at least one non-static application page;

wherein said data dictionary contains at least information regarding the presentation of said data items on said non-static application page; and wherein said database system is adapted to permit a user to provide application data by at least one method selected from the group consisting of: uploading a file, creating an application from a template, entering structure and/or organization information of said data items on a form in a network-based computer application, and entering structure and/or organization information of said data items on a form in a web browser or a network-based computer application.

50. A system as claimed in claim 49, wherein at least a portion of the data items of said received application data is in a format selected from the group consisting of: a text file, a binary file, a comma-delimited file, a Microsoft Access file, a FoxPro file, a dBase file, a Paradox file, a SQL server file, an Oracle file, a database application file, a Microsoft Excel file, a spreadsheet file, an HTML file, a schema file for a relational database, and a word processor file.

51. A system as claimed in claim 49, wherein at least one said non-static application page comprises and/or generates text and/or data in at least one format selected from the group consisting of: SGML, HTML, XML, Java, plain text, font data, color data, and graphic file data.

52. A system as claimed in claim 49, wherein said network is the Internet, a local area network, or a wide area network.

53. A system as claimed in claim 49, wherein said network interface is adapted to transmit at least one said non-static application page to a user and/or to receive said application data trough a web browser or a network-based computer application.

54. A system as claimed in claim 49, wherein said engine for building and/or updating and/or running said application is firer adapted to permit a user using a web browser or a network-based computer application to effect the creation, modification, and/or deletion of said at least one application page.

55. A system as claimed in claim 49, wherein said storage for the data items of said received application data comprises a database.

56. A system as claimed in claim 55, wherein said database system is adapted to permit a user to modify the structure, characteristics, and/or data of said database.

57. A system as claimed in claim 55, wherein said database comprises at least one component selected from the group comprising: a text file, a table for data storage, an index, and a relationship between a plurality of tables.

58. A system as claimed in claim 49, wherein at least one said non-static application page comprises at least one form selected from the group comprising: record form, new form, filter form, list form, export form, menu form, login form and report form.

59. A system as claimed in claim 49, wherein said storage comprises at least one storage device selected from the group consisting of hard disk, floppy disk, magnetic storage medium, optical storage medium, memory, RAM, removable storage medium, smart card, flash memory, memory card storage, and semiconductor-based memory.

60. A system as claimed in claim 49, wherein said network interface is further adapted to transmit at least one said non-static application page to an end user for display and/or download and/or execution.

61. A method for providing a network-based database system comprising:

receiving application data, wherein said application data contains at least data items;

if said application data further contains structure and/or organization information of said data items, building and/or updating a data dictionary based on said application data and said structure and/or organization information of said items;

if said application data does not contain structure and/or organization information of said data items, building and/or updating a data dictionary by determining the structure and/or organization information of said data items of said application data;

building and/or updating and/or running an application comprising at least one non-static application page, based on information in said data dictionary and at least a portion of said application data;

wherein said data dictionary contains at least information regarding the presentation of said data items on said non-static application page; and further comprising permitting a user to provide said application data by at least one method selected from the group consisting of: uploading a file, creating an application from a template, entering the structure and/or organization of said data items on a form in a network-based computer application, and entering the structure and/or organization of said data items on a form in a web browser or a network-based computer application.

62. A network-based database system comprising:

a network interface adapted to receive application data via a network, wherein said application data contains at least data items;

an engine for building and/or updating a data dictionary based on structure and/or organization information of said data items received via said network interface;

an engine for building and/or updating a data dictionary by determining the structure and/or organization information of said data items of said application data, if said application data does not contain structure and/or organization information of said data items;

an engine for building and/or updating and/or running an application, said application comprising at least one non-static application page; and storage for said received data items of said application data, said data dictionary, and said at least one non-static application page;

wherein said engine for building and/or updating and/or running said application employs information in said data dictionary and at least a portion of said application data to build and/or update and/or run said at least one non-static application page;

wherein said data dictionary contains at least information regarding the presentation of said data items on said non-static application page; and wherein said database system is adapted to permit a user to provide application data by at least one method selected from the group consisting of: uploading a file, creating an application from a template, entering structure and/or organization information of said data items on a form in a network-based computer application, and entering structure and/or organization information of said data items on a form in a web browser or a network-based computer application.

* * * * *

UNITED STATES PATENT AND TRADEMARK OFFICE
CERTIFICATE OF CORRECTION

| | |
|---|---|
| PATENT NO. | : 6,832,226 B1 |
| DATED | : December 14, 2004 |
| INVENTOR(S) | : Parker |

It is certified that error appears in the above-identified patent and that said Letters Patent is hereby corrected as shown below:

Column 12,
Line 38, "lava" should be -- Java --.

Column 14,
Line 40, "ran" should be -- run --.

Column 15,
Line 8, "firer" should be -- further --.

Signed and Sealed this

Twenty-first Day of June, 2005

JON W. DUDAS
*Director of the United States Patent and Trademark Office*